(12) United States Patent
Munemoto et al.

(10) Patent No.: US 11,231,815 B2
(45) Date of Patent: Jan. 25, 2022

(54) DETECTING OBJECT PROXIMITY USING TOUCH SENSITIVE SURFACE SENSING AND ULTRASONIC SENSING

(71) Applicant: Qeexo, Co., Mountain View, CA (US)

(72) Inventors: Taihei Munemoto, Pittsburgh, PA (US); William Isaac Levine, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 0 days.

(21) Appl. No.: 16/457,293

(22) Filed: Jun. 28, 2019

(65) Prior Publication Data
US 2020/0409489 A1 Dec. 31, 2020

(51) Int. Cl.
*G06F 3/043* (2006.01)
*G06F 3/0354* (2013.01)
*G06F 3/041* (2006.01)

(52) U.S. Cl.
CPC .......... *G06F 3/043* (2013.01); *G06F 3/03545* (2013.01); *G06F 3/0416* (2013.01)

(58) Field of Classification Search
CPC ..... G06F 3/043; G06F 3/03545; G06F 3/0416
See application file for complete search history.

(56) References Cited

U.S. PATENT DOCUMENTS

| | | | |
|---|---|---|---|
| 2,008,028 A | 7/1935 | Mccortney et al. | |
| 2,430,005 A | 11/1947 | Denneen et al. | |
| 3,354,531 A | 11/1967 | Pryor | |
| 4,561,105 A | 12/1985 | Crane et al. | |
| 4,597,932 A | 7/1986 | Kurihara et al. | |
| 4,686,332 A | 8/1987 | Greanias et al. | |

(Continued)

FOREIGN PATENT DOCUMENTS

| | | |
|---|---|---|
| CN | 1797305 A | 7/2006 |
| CN | 1928781 A | 3/2007 |

(Continued)

OTHER PUBLICATIONS

Final Office Action received for U.S. Appl. No. 14/684,407 dated Jan. 18, 2017, 20 pages.

(Continued)

*Primary Examiner* — Peter D McLoone
(74) *Attorney, Agent, or Firm* — Kwan & Olynick LLP

(57) ABSTRACT

Techniques enabling improved classification of touch or hover interactions of objects with a touch sensitive surface of a device are presented. A speaker of the device can emit an ultrasonic audio signal comprising a first frequency distribution. A microphone of the device can detect a reflected audio signal comprising a second frequency distribution. The audio signal can be reflected off of an object in proximity to the surface to produce the reflected audio signal. A classification component can determine movement status of the object, or classify the touch or hover interaction, in relation to the surface, based on analysis of the signals. The classification component also can classify the touch or hover interaction based on such ultrasound data and/or touch surface or other sensor data. The classification component can be trained, using machine learning, to perform classifications of touch or hover interactions of objects with the surface.

22 Claims, 11 Drawing Sheets

(56) References Cited

U.S. PATENT DOCUMENTS

| | | |
|---|---|---|
| 5,483,261 A | 1/1996 | Yasutake |
| 5,544,265 A | 8/1996 | Bozinovic et al. |
| 5,596,656 A | 1/1997 | Goldberg |
| 5,615,285 A | 3/1997 | Beernink |
| 5,625,818 A | 4/1997 | Zarmer et al. |
| 5,666,438 A | 9/1997 | Beernink et al. |
| 5,867,163 A | 2/1999 | Kurtenbach |
| 5,933,514 A | 8/1999 | Ostrem et al. |
| 6,028,593 A | 2/2000 | Rosenberg et al. |
| 6,118,435 A | 9/2000 | Fujita et al. |
| 6,208,330 B1 | 3/2001 | Hasegawa et al. |
| 6,212,295 B1 | 4/2001 | Ostrem et al. |
| 6,222,465 B1 | 4/2001 | Kumar et al. |
| 6,246,395 B1 | 6/2001 | Goyins et al. |
| 6,252,563 B1 | 6/2001 | Tada et al. |
| 6,313,825 B1 | 11/2001 | Gilbert |
| 6,323,846 B1 | 11/2001 | Westerman et al. |
| 6,337,698 B1 | 1/2002 | Kelly, Jr. et al. |
| 6,492,979 B1 | 12/2002 | Kent et al. |
| 6,504,530 B1 | 1/2003 | Wilson et al. |
| 6,643,663 B1 | 11/2003 | Dabney et al. |
| 6,707,451 B1 | 3/2004 | Nagaoka |
| 6,748,425 B1 | 6/2004 | Duffy et al. |
| 6,772,396 B1 | 8/2004 | Cronin et al. |
| 6,933,930 B2 | 8/2005 | Devige et al. |
| 6,943,665 B2 | 9/2005 | Chornenky |
| 7,024,548 B1 | 4/2006 | O'Toole, Jr. |
| 7,050,955 B1 | 5/2006 | Carmel et al. |
| 7,084,884 B1 | 8/2006 | Nelson et al. |
| 7,098,896 B2 | 8/2006 | Kushler et al. |
| 7,212,197 B1 | 5/2007 | Schkolne et al. |
| 7,443,396 B2 | 10/2008 | Ilic |
| 7,581,194 B2 | 8/2009 | Iwema et al. |
| 7,982,724 B2 | 7/2011 | Hill |
| 8,086,971 B2 | 12/2011 | Radivojevic et al. |
| 8,144,126 B2 | 3/2012 | Wright |
| 8,154,524 B2 | 4/2012 | Wilson et al. |
| 8,154,529 B2 | 4/2012 | Sleeman et al. |
| 8,170,346 B2 | 5/2012 | Ludwig |
| 8,199,126 B1 | 6/2012 | Taubman |
| 8,253,744 B2 | 8/2012 | Macura et al. |
| 8,269,744 B2 | 9/2012 | Agar et al. |
| 8,327,029 B1 | 12/2012 | Purser |
| 8,441,790 B2 | 5/2013 | Pance et al. |
| 8,547,357 B2 | 10/2013 | Aoyagi |
| 8,624,878 B2 | 1/2014 | Sarwar et al. |
| 8,670,632 B2 | 3/2014 | Wilson |
| 8,674,943 B2 | 3/2014 | Westerman et al. |
| 8,743,091 B2 | 6/2014 | Bernstein |
| 8,760,395 B2 | 6/2014 | Kim et al. |
| 8,762,332 B2 | 6/2014 | Keebler et al. |
| 8,769,524 B2 | 7/2014 | Bhullar et al. |
| 8,890,818 B2 * | 11/2014 | Arrasvuori .......... G06F 3/04883 345/173 |
| 9,013,452 B2 | 4/2015 | Harrison et al. |
| 9,019,244 B2 | 4/2015 | Harrison |
| 9,030,498 B2 | 5/2015 | Galor et al. |
| 9,052,772 B2 | 6/2015 | West |
| 9,060,007 B2 | 6/2015 | Keebler et al. |
| 9,152,306 B2 * | 10/2015 | Anderson .............. G06F 3/0304 |
| 9,182,882 B2 | 11/2015 | Fowler et al. |
| 9,329,688 B2 | 5/2016 | Harrison |
| 9,329,715 B2 | 5/2016 | Schwarz et al. |
| 9,377,863 B2 | 6/2016 | Bychkov et al. |
| 9,557,852 B2 | 1/2017 | Tsai et al. |
| 9,612,689 B2 | 4/2017 | Harrison et al. |
| 9,696,859 B1 | 7/2017 | Heller et al. |
| 9,864,453 B2 | 1/2018 | Munemoto et al. |
| 10,082,935 B2 | 9/2018 | Harrison et al. |
| 10,642,370 B2 * | 5/2020 | Borstad ................. G01S 15/325 |
| 2002/0009227 A1 | 1/2002 | Goldberg et al. |
| 2002/0057837 A1 | 5/2002 | Wilkinson et al. |
| 2002/0070927 A1 | 6/2002 | Fujitsuka et al. |
| 2002/0126161 A1 | 9/2002 | Kuzunuki et al. |
| 2003/0048260 A1 | 3/2003 | Matusis |
| 2003/0110085 A1 | 6/2003 | Murren et al. |
| 2003/0132922 A1 | 7/2003 | Phillip |
| 2003/0217873 A1 | 11/2003 | Paradiso et al. |
| 2004/0012573 A1 | 1/2004 | Morrison et al. |
| 2004/0021681 A1 | 2/2004 | Liao |
| 2004/0054711 A1 | 3/2004 | Multer |
| 2004/0141010 A1 | 7/2004 | Fitzmaurice et al. |
| 2004/0160421 A1 | 8/2004 | Sullivan |
| 2004/0199867 A1 | 10/2004 | Brandenborg |
| 2004/0225730 A1 | 11/2004 | Brown et al. |
| 2005/0083313 A1 | 4/2005 | Hardie-Bick |
| 2005/0131778 A1 | 6/2005 | Bennett et al. |
| 2005/0146512 A1 | 7/2005 | Hill et al. |
| 2005/0289461 A1 | 12/2005 | Amado et al. |
| 2006/0010400 A1 | 1/2006 | Dehlin et al. |
| 2006/0026535 A1 | 2/2006 | Hotelling et al. |
| 2006/0031746 A1 | 2/2006 | Toepfer et al. |
| 2006/0152499 A1 | 7/2006 | Roberts |
| 2006/0173985 A1 | 8/2006 | Moore |
| 2006/0184617 A1 | 8/2006 | Nicholas et al. |
| 2006/0217126 A1 | 9/2006 | Sohm et al. |
| 2006/0230021 A1 | 10/2006 | Diab et al. |
| 2006/0241916 A1 | 10/2006 | Sieracki |
| 2006/0288329 A1 | 12/2006 | Gandhi et al. |
| 2007/0011205 A1 | 1/2007 | Majasie et al. |
| 2007/0044010 A1 | 2/2007 | Sull et al. |
| 2007/0075965 A1 | 4/2007 | Huppi et al. |
| 2007/0085157 A1 | 4/2007 | Fadell et al. |
| 2007/0100959 A1 | 5/2007 | Eichstaedt et al. |
| 2007/0109279 A1 | 5/2007 | Sigona |
| 2007/0126716 A1 | 6/2007 | Haverly |
| 2007/0168367 A1 | 7/2007 | Dickinson et al. |
| 2007/0186157 A1 | 8/2007 | Walker et al. |
| 2007/0192674 A1 | 8/2007 | Bodin et al. |
| 2007/0192910 A1 | 8/2007 | Vu |
| 2007/0245020 A1 | 10/2007 | Ott, IV |
| 2007/0257767 A1 | 11/2007 | Beeson |
| 2007/0291297 A1 | 12/2007 | Harmon et al. |
| 2008/0005666 A1 | 1/2008 | Sefton et al. |
| 2008/0036743 A1 | 2/2008 | Westerman et al. |
| 2008/0042978 A1 | 2/2008 | Perez-Noguera |
| 2008/0082941 A1 | 4/2008 | Goldberg et al. |
| 2008/0103906 A1 | 5/2008 | Singh |
| 2008/0117168 A1 | 5/2008 | Liu et al. |
| 2008/0126388 A1 | 5/2008 | Naaman |
| 2008/0141132 A1 | 6/2008 | Tsai |
| 2008/0155118 A1 | 6/2008 | Glaser et al. |
| 2008/0158147 A1 | 7/2008 | Westerman et al. |
| 2008/0158168 A1 | 7/2008 | Westerman et al. |
| 2008/0158185 A1 | 7/2008 | Westerman |
| 2008/0168403 A1 | 7/2008 | Westerman et al. |
| 2008/0180406 A1 | 7/2008 | Han et al. |
| 2008/0244468 A1 | 10/2008 | Nishihara et al. |
| 2008/0288347 A1 | 11/2008 | Sifry |
| 2008/0319932 A1 | 12/2008 | Yih et al. |
| 2009/0025987 A1 | 1/2009 | Perksi et al. |
| 2009/0073144 A1 | 3/2009 | Chen et al. |
| 2009/0095540 A1 | 4/2009 | Zachut et al. |
| 2009/0150373 A1 | 6/2009 | Davis et al. |
| 2009/0157206 A1 | 6/2009 | Weinberg et al. |
| 2009/0174679 A1 | 7/2009 | Westerman |
| 2009/0178011 A1 | 7/2009 | Ording et al. |
| 2009/0231275 A1 | 9/2009 | Odgers |
| 2009/0232355 A1 | 9/2009 | Minear et al. |
| 2009/0254869 A1 | 10/2009 | Ludwig et al. |
| 2009/0259628 A1 | 10/2009 | Farrell et al. |
| 2009/0262637 A1 | 10/2009 | Badaye et al. |
| 2009/0315835 A1 | 12/2009 | De Goes et al. |
| 2009/0318192 A1 | 12/2009 | Leblanc et al. |
| 2010/0036967 A1 | 2/2010 | Caine et al. |
| 2010/0060602 A1 | 3/2010 | Agari et al. |
| 2010/0085216 A1 | 4/2010 | Ms |
| 2010/0094633 A1 | 4/2010 | Kawamura et al. |
| 2010/0123666 A1 | 5/2010 | Wickholm et al. |
| 2010/0127997 A1 | 5/2010 | Park et al. |
| 2010/0194703 A1 | 8/2010 | Fedor et al. |
| 2010/0214267 A1 | 8/2010 | Radivojevic et al. |
| 2010/0225601 A1 | 9/2010 | Homma et al. |
| 2010/0251112 A1 | 9/2010 | Hinckley et al. |

(56) References Cited

U.S. PATENT DOCUMENTS

| | | |
|---|---|---|
| 2010/0265185 A1 | 10/2010 | Oksanen |
| 2010/0271322 A1 | 10/2010 | Kondoh et al. |
| 2010/0274622 A1 | 10/2010 | Kennedy et al. |
| 2010/0279738 A1 | 11/2010 | Kim et al. |
| 2010/0289754 A1 | 11/2010 | Sleeman et al. |
| 2010/0302184 A1 | 12/2010 | East et al. |
| 2010/0306649 A1 | 12/2010 | Russ et al. |
| 2010/0309158 A1 | 12/2010 | Iwayama et al. |
| 2010/0309933 A1 | 12/2010 | Stark et al. |
| 2011/0003550 A1 | 1/2011 | Klinghult et al. |
| 2011/0007000 A1 | 1/2011 | Lim |
| 2011/0018825 A1 | 1/2011 | Kondo et al. |
| 2011/0057670 A1 | 3/2011 | Jordan |
| 2011/0057885 A1 | 3/2011 | Lehtovirta |
| 2011/0074544 A1 | 3/2011 | D'Souza |
| 2011/0074701 A1 | 3/2011 | Dickinson et al. |
| 2011/0080349 A1 | 4/2011 | Holbein et al. |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1 | 7/2011 | Momeyer et al. |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1 | 1/2012 | Li et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0068941 A1* | 3/2012 | Arrasvuori .......... G06F 3/04883 345/173 |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0206339 A1 | 8/2012 | Dahl |
| 2012/0243374 A1 | 9/2012 | Dahl |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Sarnoff |
| 2013/0038554 A1 | 2/2013 | West |
| 2013/0091123 A1 | 4/2013 | Chen et al. |
| 2013/0100071 A1 | 4/2013 | Wright et al. |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0071069 A1* | 3/2014 | Anderson ............... A63F 13/06 345/173 |
| 2014/0071095 A1 | 3/2014 | Godsill |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240295 A1 | 8/2014 | Harrison |
| 2014/0253477 A1 | 9/2014 | Shim et al. |
| 2014/0267065 A1 | 9/2014 | Levesque |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0368436 A1 | 12/2014 | Abzarian et al. |
| 2014/0368601 A1 | 12/2014 | Decharms |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0145820 A1 | 5/2015 | Huang et al. |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0002405 A1 | 1/2016 | Johnson et al. |
| 2016/0018348 A1 | 1/2016 | Kang et al. |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1 | 4/2016 | Veneri et al. |
| 2016/0156837 A1 | 6/2016 | Rodzevski et al. |
| 2016/0171192 A1 | 6/2016 | Holz et al. |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim et al. |
| 2018/0329567 A1 | 11/2018 | Munemoto |
| 2019/0050061 A1* | 2/2019 | Borstad .................. G06F 3/038 |
| 2019/0346969 A1 | 11/2019 | Yip |

FOREIGN PATENT DOCUMENTS

| | | |
|---|---|---|
| CN | 101111817 A | 1/2008 |
| CN | 101299174 A | 11/2008 |

(56) References Cited

FOREIGN PATENT DOCUMENTS

| | | | |
|---|---|---|---|
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| EP | 0 938 039 A2 | 8/1999 |
| EP | 1 659 481 A2 | 5/2006 |
| EP | 1 762 926 A2 | 3/2007 |
| EP | 2 136 358 A1 | 12/2009 |
| EP | 2 280 337 A2 | 2/2011 |
| GB | 2 344 894 A | 6/2000 |
| GB | 2 468 742 A | 9/2010 |
| JP | H09-69137 A | 3/1997 |
| JP | 2004-213312 A | 7/2004 |
| JP | 2005-018611 A | 1/2005 |
| JP | 2007-524970 A | 8/2007 |
| JP | 2009-543246 A | 12/2009 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-0061227 A | 6/2011 |
| KR | 10-2012-0100351 A | 9/2012 |
| WO | 94/004992 A1 | 3/1994 |
| WO | 2006/070044 A1 | 7/2006 |
| WO | 2008/126347 A1 | 10/2008 |
| WO | 2009/071919 A1 | 6/2009 |
| WO | 2011/096694 A2 | 8/2011 |
| WO | 2012/064034 A1 | 5/2012 |
| WO | 2012166277 A1 | 12/2012 |
| WO | 2013/059488 A1 | 4/2013 |
| WO | 2013/061998 A1 | 5/2013 |
| WO | 2014/037951 A1 | 3/2014 |
| WO | 2014/182435 A1 | 11/2014 |

OTHER PUBLICATIONS

Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Final Office Action received for U.S. Appl. No. 14/219,919, dated Aug. 26, 2016, 24 pages.
Non-Final Office Action received for U.S. Appl. No. 14/191,329, dated on Feb. 2, 2017, 20 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Non-Final Office Action received for U.S. Appl. No. 14/486,800, dated Dec. 1, 2016, 29 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 14/684,407, dated Sep. 14, 2018, 24 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 13/958,427, dated Mar. 13, 2015, 50 pages.
Final Office Action received for U.S. Appl. No. 13/958,427, dated Jun. 19, 2015, 17 pages.
Non-Final Office Action received for U.S. Appl. No. 13/887,711, dated Apr. 6, 2015, 36 pages.
Final Office Action received for U S U.S. Appl. No. 14/191,329, dated Aug. 7, 2015, 29 pages.
Non-Final Office Action received for U.S. Appl. No. 14/492,604, dated Oct. 1, 2015, 16 pages.
International Search Report and Written Opinion received for PCT Application No. PCT/US2014/049485 dated Nov. 17, 2014, 9 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
Non-Final Office Action received for U.S. Appl. No. 14/483,150 dated Dec. 18, 2015, 7 pages.
Non-Final Office Action—dated Oct. 2, 2015 U.S. Appl. No. 14/486,800, filed Sep. 15, 2014, 21 pages.
Non-Final Office Action received for U.S. Appl. No. 14/503,894, dated Dec. 30, 2015, 18 pages.
Non-Final Office Action—dated Jan. 29, 2016 U.S. Appl. No. 14/219,919, 11 pages.
Non-Final Office Action received dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action—dated Oct. 7, 2015 U.S. Appl. No. 14/495,041, 14 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture ofVibro-Acoustic Data Used to Determine Touch Types."
U.S. Appl. No. 14/191,329, filed Feb. 26, 2014, titled: "Using Capacitive Images for Touch Type Classification."

(56) References Cited

OTHER PUBLICATIONS

U.S. Appl. No. 13/887,711, filed May 6, 2013, titled: "Using Finger Touch Types to Interact with Electronic Devices."
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages (with Translation).
Chinese Office Action dated Feb. 9, 2018 for Chinese Patent Application No. 201480022056.5, 19 pages (with Translation).
Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Chinese First Office Action received for Chinese Patent Application No. 201510240372.6 dated Sep. 27, 2018, 18 pages.
Chinese Second Office Action received for Chinese Patent Application No. 201510240372.6 dated May 15, 2019, 16 pages.
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 8 pages.
Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 8 pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
European Search Report dated Apr. 8, 2019 for European Application No. 18195588.1, 7 pages.
Non-Final Office Action received for U.S. Appl. No. 15/836,798 dated Jul. 5, 2019, 95 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
Chinese First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.
Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.
U.S. Appl. No. 14/492,604, filed Sep. 22, 2014, titled: "Method and Apparatus for Improving Accuracy of Touch Screen Event Analysis by Use of Edge Classification." 35 pages.
U.S. Appl. No. 14/495,041, filed Sep. 24, 2014, titled: "Method for Improving Accuracy of Touch Screen Event Analysis by Use of Spatiotemporal Touch Patterns." 34 pages.
U.S. Appl. No. 14/483,150, filed Sep. 11, 2014, titled: "Method and Apparatus for Differentiating Touch Screen Users Based on Touch Event Analysis." 38 pages.
U.S. Appl. No. 14/242,127, filed Apr. 1, 2014, titled: Method and Apparatus for Classifying Dtouch Events on a Touch Sensitive Surface, 36 pages.
U.S. Appl. No. 13/849,698, filed Mar. 23, 2013, titled: "Method and System for Activating Different Interactive Functions Using Different Types of Finger Contacts." 52 pages.
U.S. Appl. No. 13/780,494, filed Feb. 28, 2013, titled: "Input Tools Having Viobro-Acoustically Distinct Regions and Computing Device for Use With the Same." 34 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.
Cheng, B. et al., "SilentSense: Silent User Identification via Dynamics of Touch and Movement Behavioral Biometrics," Cryptography and Security (cs CR); Human-Computer Interaction, pp. 9, Aug. 31, 2013.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.

(56) References Cited

OTHER PUBLICATIONS

English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason For Refusal dated Jul. 10, 2014 in Korean patent application No. 10-2014-0027979, 3 pages.
Final Office Action dated Jan. 5, 2018 in U.S. Appl. No. 14/503,894, 16 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Communication pursuant to Article 94(3) EPC dated Feb. 26, 2018 for European Patent Application No. 14785422.8, 7 pages.
Communication pursuant to Article 94(3) EPC dated Mar. 5, 2018 for European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Weidong, S. et al., "SenGuard: Passive user identification on smartphones using multiple sensors," IEEE 7th International Conference on Wireless and Mobile Computing, Networking and Communications (WiMob), pp. 141-148, 2011.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Pedro, L et al., "Augmenting touch interaction through acoustic sensing", Proceedings of the ACM International Conference on Interactive Tabletops and Surfaces, pp. 53-56, Nov. 13-16, 2011.
Sarah, M. K. et aL, "A Personal Touch—Recognizing Users Based on Touch Screen Behavior," PhoneSense'12, Nov. 6, 2012, Toronto, ON, Canada, Nov. 6, 2012, pp. 5.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.

"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Metal., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.

(56) References Cited

OTHER PUBLICATIONS

Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages.
Chinese Office Action for Chinese Patent Application No. 201280062500.7, dated Apr. 27, 2018, 19 pages.
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 11 pages (including English translation).
Office Action dated Jan. 28, 2019 for U.S. Appl. No. 15/836,798, 30 pages.
Non-Final Office Action received for U.S. Appl. No. 14/242,127 dated Jun. 2, 2015, 33 pages.
Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Asano et al., "Real-Time Sound Source Localization and Separation System and Its Application to Automatic Speech Recognition", Proceedings of Eurospeech, 2001; p. 1013-1016; 2001.
Benko et al., "Sphere: Multi-Touch Interactions on a Spherical Display", Proceedings of UIST, 2008; pp. 77-86.
Burges, Christopher J.C., "A Tutorial on Support Vector Machines for Pattern Recognition", Data Mining and Knowledge Discovery, 2, 1998 pp. 121-167.
Cao et al., "ShapeTouch: Leveraging Contact Shape on Interactive Surfaces", IEEE International Workshop on Horizontal Interactive Human Computer System (TableTop), 2008, pp. 139-146.
Deyle et al., "Hambone: A Bio-Acoustic Gesture Interface", Proceedings of ISWC, 2007, pp. 1-8.
Dietz et al., DT Controls: Adding Identity to Physical Interfaces, ACM Symposium on User Interface Software & Technology (UIST), 2005, pp. 245-252.
Dietz et al., "DiamondTouch: A Multi-User Touch Technology" ACM Symposium on User Interface Software & Technology (UIST), 2001, pp. 219-226.
Gutwin et al., "Supporting Informal Collaboration in Shared-Workspace Groupware", Journal of Universal Computer Science, vol. 14, No. 9, 2008, pp. 1411-1434.
Hall et al., "The WEKA Data Mining Software: An Update", SIGKDD Explorations,vol. 11, No. 1, 2009, pp. 10-18.
Harrison et al., Skinput: Appropriating the Body as an Input Surface, Proceedings of CHI, Apr. 10-15, 2010, pp. 453-462.
Harrison et al., "Scratch Input: Creating Large, Inexpensive, Unpowered and Mobile Finger Input Surfaces", Proceedings of UIST, 2008, pp. 205-208.
Hartmann et al., "Augmenting Interactive Tables with Mice & Keyboards", Proceedings of UIST, 2009, pp. 149-152.

Hinckley et al., "Sensor Synaesthesia: Touch in Motion, and Motion in Touch", Proceedings of CHI, 2011, pp. 801-810.
Hinckley et al., "Pen+ Touch= New Tools", Proceedings of UIST, 2010, pp. 27-36.
Hinkley et al., "Manual Deskterity: An Exploration of Simultaneous Pen+ Touch Direct Input", Proceedings of CHI, 2010, pp. 2793-2802.
Holz et al., "The Generalized Perceived Input Point Model and How to Double Touch Accuracy by Extracting Fingerprints" Proceedings of CHI, 2010, pp. 581-590.
Kaltenbrunner., "reacTIVision: A Computer-Vision Framework for Table-Based Tangible Interaction", Proceedings ofTEI, 2007, pp. 69-74.
Matsushita et al., "HoloWall: Designing a Finger, Hand, Body, and Object Sensitive Wall", Proceedings of UIST, 1997, pp. 209-210.
"Mimio", http://www.mimio.com, retrieved Jul. 8, 2019, 8 pages.
Olwal et al., "SurfaceFusion: Unobtrusive Tracking of Everyday Objects in Tangible User Interfaces", Proceedings of GI, 2008, pp. 235-242.
Paradiso et al., "Tracking and Characterizing Knocks Atop Large Interactive Displays", Sensor Review, vol. 25, No. 2, 2005, pp. 134-143.
Paradiso et al., "Sensor Systems for Interactive Surfaces", IBM Systems Journal, vol. 39 No. 384, 2000, pp. 892-914.
Patten, James, Mcmichael., "Sensetable: A Wireless Object Tracking Platform for Tangible User Interfaces", Proceedings of CHI, 2001, pp. 253-260.
Rekimoto et al., "Augmented Surfaces: A Spatially Continuous Work Space for Hybrid Computing Environments", Proceedings of CHI, 1999, pp. 378-385.
Rekimoto et al., "ToolStone: Effective use of the Physical Manipulation Vocabularies of Input Devices", Proceedings of UIST, 2000, pp. 109-117.
Rekimoto et al., "SmartSkin: An Infrastructure for Freehand Manipulation on Interactive Surfaces", Proceedings of CHI, 2002, pp. 113-120.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.
International Search Report and Written Opinion received for International Patent Application No. PCT/US2012/060865 dated Mar. 29, 2013, 10 pages.
Non-Final Office Action received for U.S. Appl. No. 15/206,554 dated Sep. 21, 2016, 36 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages.
Japanese Office Action for Japanese Patent Application No. 2014-537253 dated May 16, 2017, 5 pages.
Seo et al., "Audio Fingerprinting Based on Normalized Spectral Subband Centroids," Proc. ICASSP, {U.S.A.), 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
European Search Report dated Jul. 24, 2015 for European Application No. 12842495.9, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.

(56) References Cited

OTHER PUBLICATIONS

Japanese Office Action for Japanese Patent Application No. 2017-049566 dated Jun. 5, 2018, 7 pages.
Non-Final Office Action received for U.S. Appl. No. 14/684,407 dated Jul. 8, 2016, 11 pages.
Office Action dated Jan. 28, 2021 for U.S. Appl. No. 16/776,399 (pp. 1-14).
International Search Report and Written Opinion for App. No. PCT/US2020/039922, dated Sep. 11, 2020, 18 pages.
International Search Report and Written Opinion for App. No. PCT/US21/15292, dated Apr. 7, 2021, 17 pages.

* cited by examiner

DETECTING OBJECT PROXIMITY USING TOUCH SENSITIVE SURFACE SENSING AND ULTRASONIC SENSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to touch sensitive surface technology, e.g., detecting object proximity using touch sensitive surface sensing and ultrasonic sensing.

BACKGROUND

Various electronic devices today typically can be operated by a user interacting with a touch screen or other type of touch sensitive surface. This feature is particularly a characteristic of the recent generation of smart phones. Typically, touch display screens can respond to finger contact to activate the touch display screen for further processes. Contact also can be made with the touch display screen using tools such as a stylus, other parts of the hand of the user, such as the palm and various parts of the finger, or the ear or face of the user.

The above-described description is merely intended to provide a contextual overview relating to touch sensitive devices, and is not intended to be exhaustive.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

A touch display screen can respond to finger contact of a user to activate the display to enable access to applications, functions, or features of the electronic device and/or to enable further processes to be performed. Contact also can be made with the touch display screen using tools, such as a stylus, or other parts of the body, such as an ear, a face, a palm and/or various parts of the finger of the user. A touch display screen can sense user inputs, such as a finger(s) or a stylus, associated with the user that come in contact with and/or in proximity to the surface of the touch display screen. The touch display screen can encapsulate the intended actions of the user with respect to the touch display screen as touch events and can communicate such touch events to a system to respond appropriately (e.g., accordingly) to the touch events (e.g., to enable access to and perform operations in connection with the applications, functions, or features of the electronic device and/or to enable further processes associated with the electronic device to be performed). However, there can instances where unintentional touch or hover interactions may be reported to the system.

In accordance with a non-limiting, example implementation, a method can comprise emitting, by a system comprising a processor, an audio signal, comprising at least a first frequency, from an electronic device, wherein the electronic device comprises a touch sensitive screen. The method also can comprise detecting, by the system, a reflected audio signal comprising at least a second frequency, wherein the audio signal is reflected off of an object in proximity to the touch sensitive screen to produce the reflected audio signal. The method further can include determining, by the system, a movement status of the object in relation to the touch sensitive screen, based at least in part on a frequency shift between the first frequency of the audio signal and the second frequency of the reflected audio signal, to facilitate classifying an interaction of the object with the touch sensitive screen.

In accordance with another non-limiting, example implementation, a system can comprise at least one speaker configured to emit an ultrasonic audio signal, comprising at least a first frequency, from an electronic device, wherein the electronic device comprises a touch sensitive screen. The system also can comprise at least one audio sensor configured to sense a reflected ultrasonic audio signal comprising at least a second frequency, wherein the ultrasonic audio signal is reflected off of an object in proximity to the touch sensitive screen to produce the reflected ultrasonic audio signal. The system further can include a memory that stores executable components, and a processor, operatively coupled to the memory, that executes the executable components. The executable components can include a classification component configured to determine a movement status of the object in relation to the touch sensitive screen, based at least in part on a frequency shift between the first frequency of the ultrasonic audio signal and the second frequency of the reflected ultrasonic audio signal, to facilitate classifying an interaction of the object with the touch sensitive screen.

In accordance with still another non-limiting, example implementation, a machine-readable medium can comprise executable instructions that, when executed by a processor, facilitate performance of operations. The operations can comprise transmitting an ultrasonic audio signal, comprising a first frequency, from an electronic device, wherein the electronic device comprises a touch sensitive surface. The operations also can include sensing a reflected ultrasonic audio signal comprising a second frequency, wherein the ultrasonic audio signal is reflected off of an object in proximity to the touch sensitive surface to produce the reflected ultrasonic audio signal. The operations further can comprise determining movement activity of the object in relation to the touch sensitive surface, based at least in part on a frequency shift between the first frequency of the ultrasonic audio signal and the second frequency of the reflected ultrasonic audio signal, to facilitate classifying an interaction of the object with the touch sensitive surface.

The following description and the annexed drawings set forth certain illustrative aspects of the specification. These aspects are indicative, however, of but a few of the various ways in which the principles of the specification may be employed. Other advantages and enhanced features of the specification will become apparent from the following detailed description of the specification when considered in conjunction with the drawings.

BRIEF DESCRIPTION OF THE DRAWINGS

Numerous aspects, implementations, objects, and advantages of the disclosed subject matter will be apparent upon consideration of the following detailed description, taken in conjunction with the accompanying drawings, in which like reference characters can refer to like parts throughout, and in which.

DETAILED DESCRIPTION

Figure 1:
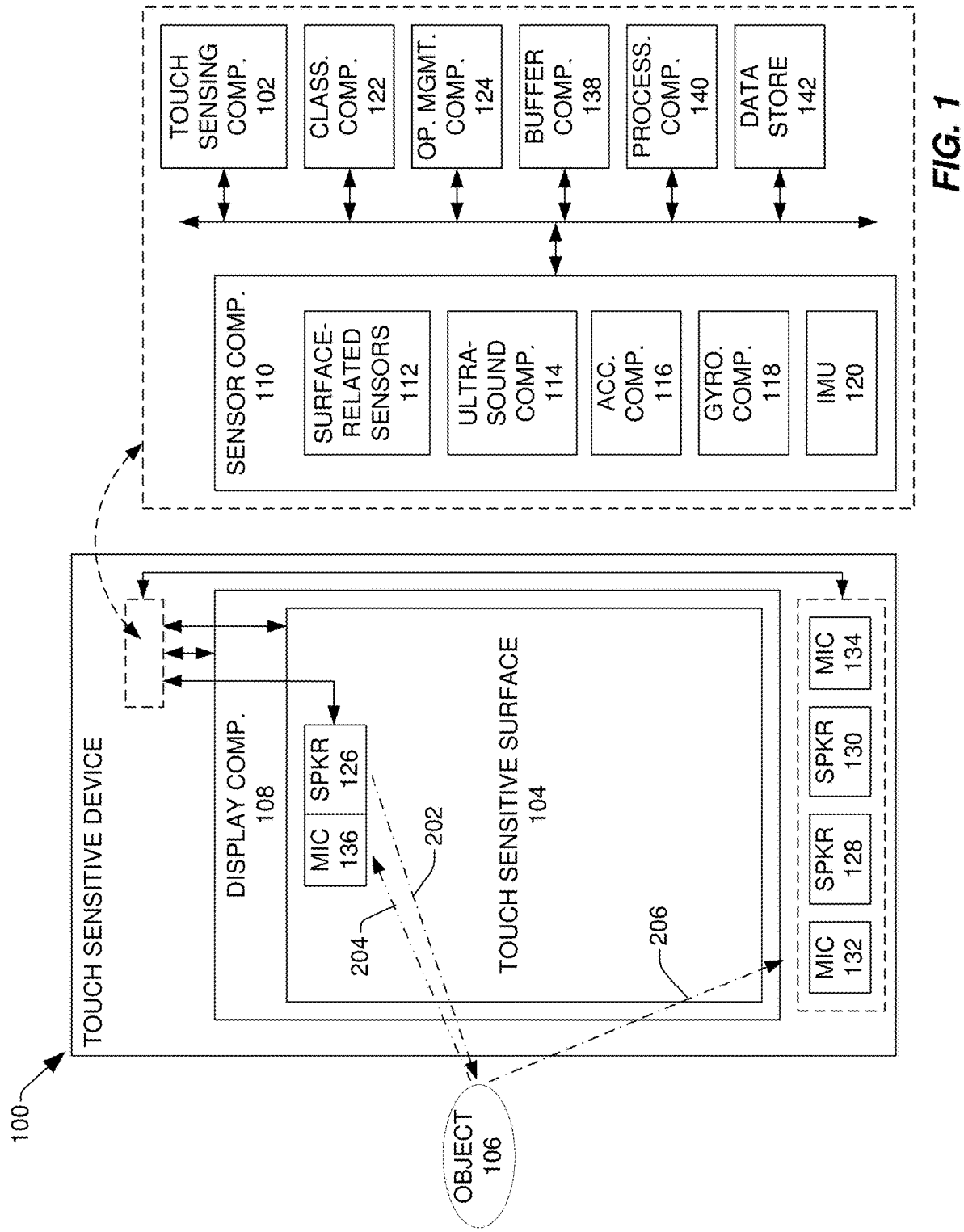
FIG. 1 illustrates a block diagram of a front (or top) view of an example touch sensitive device that can utilize ultrasonic audio signals to determine a classification of a touch or hover interactions of an object with a touch sensitive surface of the touch sensitive device, in accordance with various aspects and embodiments of the disclosed subject matter.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure might be practiced without these specific details, or with other methods, components, materials, etc. In other instances, well-known structures and devices are shown in block diagram form to facilitate describing one or more aspects.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The figures in the following description relate to preferred embodiments by way of illustration only. The figures are not necessarily to scale. It should be noted that from the following discussion, alternative embodiments of the structures and methods disclosed herein will be readily recognized as viable alternatives that may be employed without departing from the principles of what is claimed.

Various electronic devices today typically can be operated by a user interacting with a touch display screen. This feature is particularly a characteristic of the recent generation of smart phones, electronic pads or tablets, and certain computers. Typically, a touch display screen can comprise a touch sensitive surface that can respond to finger contact to activate and/or utilize the touch display screen for further processes. Contact also can be made with the touch display screen using tools, such as a stylus, other parts of the hand of the user, such as the palm and/or various parts of the finger, or other parts of the body, such as an ear or face of the user.

There can be instances where a user of an electronic device can unintentionally and undesirably touch the touch display screen to activate the touch display screen and/or cause unintentional and undesirable operations to be performed by the electronic device based on the unintentional and undesirable touching of the touch display screen. For example, the user can be using the electronic device (e.g., smart or mobile phone) to make a phone call and can place the touch display screen against or near the ear or face of the user, as the device can comprise a speaker that can be placed in proximity to the touch display screen. The ear or face of the user can undesirably interact with the touch display screen while the user is making the phone call, wherein, for example, the ear or cheek of the user can be touching or pressing against a button or control on the touch display screen, which can result in undesired operations being performed by the device. As another example, the user can be gripping the device in the user's hand, and one or more fingers of the user can be wrapped around the device such that the one or more fingers can unintentionally come in contact with or sufficient proximity to the touch display screen, or the palm or other body part of the user can unintentionally come in contact with or sufficient proximity to the touch display screen, to unintentionally activate the touch display screen and/or cause an unintentional operation(s) to be performed by the device, in response to the unintentional touch or hover interaction by the one or more fingers, palm, or other body part with the touch display screen.

Another issue is that, when there is undesired contact or other undesired interaction (e.g., hovering interaction) with the touch display screen, the touch display screen and other components of the device can be in an on state and undesirably and unnecessarily utilizing resources, including consuming power from the battery of the device, which can divert resources from being available for other operations of the device and/or can reduce available battery power in the short term and can shorten battery life of the battery in the long term. For example, while the user is using the device (e.g., mobile phone) for a phone call and has the phone against or near the user's ear, the user's ear and/or face can be touching or hovering in proximity to, and interacting with, the touch display screen, which can result in the touch display screen and other components of the device being in an on state and/or performing operations, even though the user is not desiring to use or interact with the touch display screen while the device is being held against or in proximity to the user's ear during the phone call.

The disclosed subject matter can overcome these and other problems or deficiencies associated with touch display screens or other touch pads. To that end, the disclosed subject matter can employ techniques that can enable improved classification of touch or hover interactions of objects with a touch sensitive surface (e.g., touch display screen) of a device (e.g., touch sensitive device) are presented. A speaker(s) of the device can emit an audio signal (e.g., an ultrasonic audio signal) comprising a first distribution of frequencies. A microphone(s) of the device can detect a reflected audio signal comprising a second distribution of frequencies, wherein the audio signal can be reflected off of an object in proximity to the touch sensitive surface to produce the reflected audio signal.

The disclosed subject matter can comprise a classification component that can analyze the ultrasound data, including the reflected audio signal comprising the second distribution of frequencies, the audio signal comprising the first distribution of frequencies, and/or a distribution of frequency shifts between the first distribution of frequencies of the audio signal and the second distribution of frequencies of the reflected audio signal. Based at least in part on the results of the analysis of the ultrasound data, the classification component can determine a movement status of the object in relation to the touch sensitive surface, and/or can classify a touch or hover interaction of the object with the touch sensitive surface.

In some embodiments, the classification component can perform classifications of touch or hover interactions of objects with the touch sensitive surface based at least in part on the ultrasound data and/or other sensor data. For example, the touch sensitive device can comprise surface-related sensors (e.g., touch sensors) that can be associated with the touch sensitive surface, an accelerometer, a gyroscope, an inertial measurement unit (IMU), and/or another type of sensor. The surface-related sensors can detect whether a touch interaction of an object with the touch sensitive surface has occurred, and/or the accelerometer, gyroscope, and/or IMU can detect whether a touch or hover interaction has occurred and/or detect motion and/or orientation of the object or device. The classification component can receive the other sensor data (e.g., touch surface data, accelerometer data, gyroscope data, and/or IMU data) from those other sensors. The classification component can analyze the ultrasound data and/or the other sensor data. Based at least in part on the results of the analysis of the ultrasound data and/or the other sensor data, the classification component can classify the touch or hover interaction of the object with the touch sensitive surface, in accordance with defined classification criteria. For instance, the classification component can classify a touch or hover interaction of an object with the touch sensitive surface as an intentional touch interaction or an unintentional touch or hover interaction, and/or can further classify the particular type of touch or hover interaction (e.g., intentional finger touch interaction, intentional stylus touch interaction, unintentional finger touch or hover interaction, unintentional ear or face touch or hover interaction, unintentional stylus touch or hover interaction, or unintentional palm touch or hover interaction, . . . ).

In certain embodiments, the classification component (e.g., a classification engine of the classification component) can be trained, using machine learning, to desirably perform classifications of touch or hover interactions of objects with the touch sensitive surface. For instance, the classification component can comprise a machine learning component that can be trained (e.g., by a training component) to distinguish between and identify different types of touch or hover interactions with the touch sensitive surface, including distinguishing between and identifying intentional touch interactions and unintentional touch or hover interactions, and distinguishing between and identifying particular types of touch or hover interactions.

The disclosed subject matter also can comprise an operation management component that can control operations associated with the touch sensitive device, including operations associated with the touch sensitive surface. For instance, in response to the classification component detecting an unintentional touch or hover interaction, the operation management component can reject the unintentional touch or hover interaction, disable a function of the touch sensitive surface, place (e.g., switch or maintain) the touch sensitive surface in a locked state, place (e.g., switch or maintain) the touch sensitive surface (e.g., touch display screen) of the device in an off state, and/or otherwise prevent an operation being performed on the device due to the unintentional touch or hover interaction. In response to the classification component detecting an intentional touch interaction with the touch sensitive surface, the operation management component can place (e.g., switch or maintain) the touch sensitive surface in an on state, place (e.g., switch or maintain) the touch sensitive surface in an unlocked state, and/or enable (e.g., allow) a touch sensitive function of the touch sensitive surface of the touch display screen and/or the operation(s) associated with the intentional touch interaction to be performed by the device (e.g., by the touch display screen, application associated with the device, . . . ).

These and other aspects and embodiments of the disclosed subject matter are described with regard to the figures.

Figure 2:
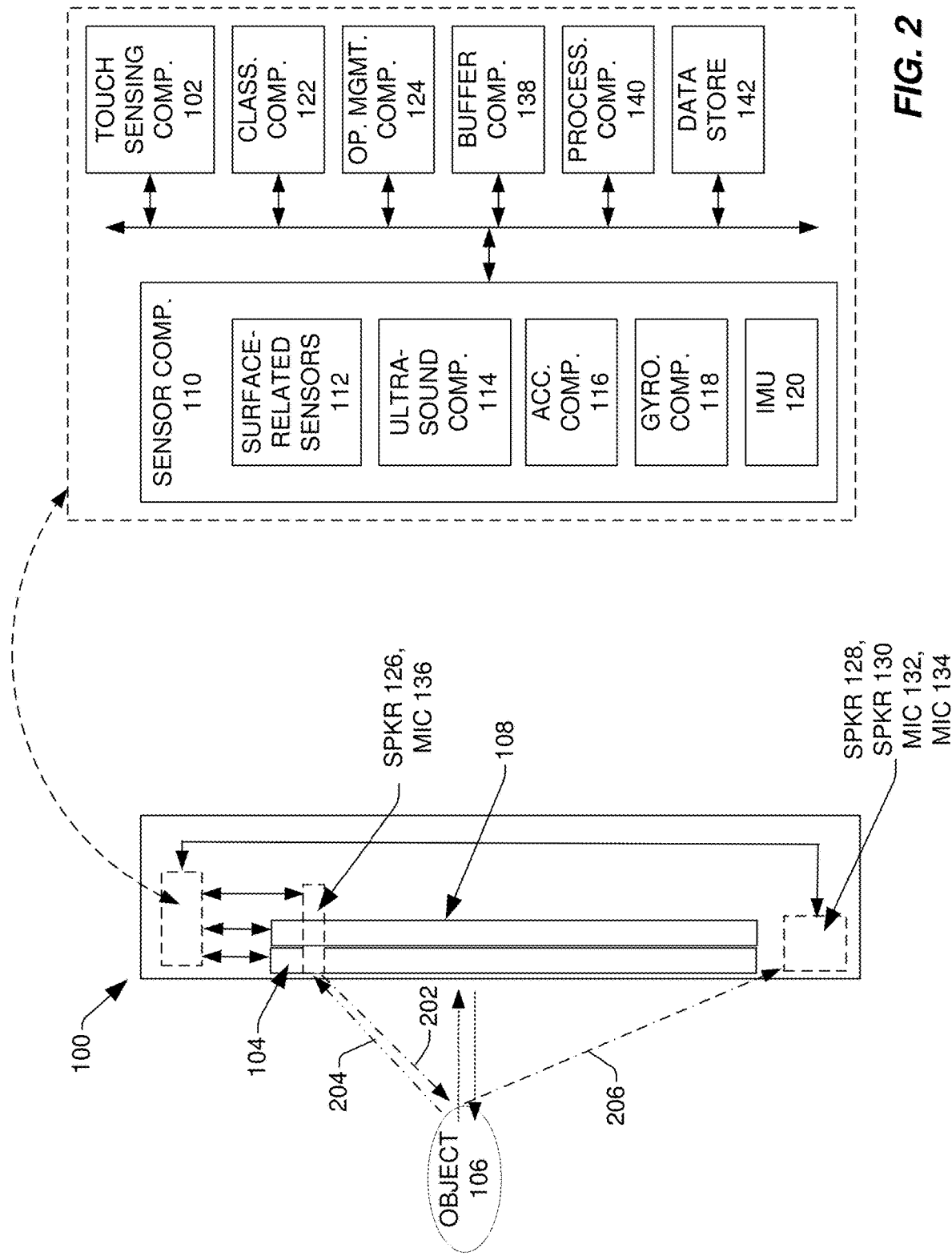
FIG. 2 illustrates a block diagram of a side view of an example touch sensitive device that can utilize ultrasonic audio signals to determine a classification of a touch or hover interactions of an object with a touch sensitive surface of the touch sensitive device, in accordance with various aspects and embodiments of the disclosed subject matter.

FIG. 1 and FIG. 2 illustrate block diagrams of a front view and a side view, respectively, of an example touch sensitive device 100 that can utilize ultrasonic audio signals to determine a classification of a touch or hover interactions of an object with a touch sensitive surface of the touch sensitive device, in accordance with various aspects and embodiments of the disclosed subject matter. The touch sensitive device 100 can be or can comprise, for example, a mobile phone (e.g., a cellular phone and/or smart phone), a computer, a display table, a personal digital assistant (PDA), an electronic tablet or notebook (e.g., a touch sensitive graphic tablet or notebook), a web pad, electronic bodywear (e.g., a smart watch or other electronic bodywear that comprises a touch sensitive surface), an electronic gaming device, an electronic workstation, a television, an Internet protocol (IP) television, a set-top box, a device (e.g., touch sensitive device) in or integrated with a vehicle, a touch pad, a track pad, or other type of device.

The touch sensitive device 100 can comprise a touch sensing component 102 (touch sensing comp. 102) that can comprise or be associated with a touch sensitive surface 104 that can sense when an object(s) 106 (e.g., finger(s) of a user, palm of the user, ear or face of the user, other body part of the user, or stylus) has been brought into contact with the touch sensitive surface 104 or is in proximity to (e.g., is hovering over and/or in proximity to) the touch sensitive surface 104. The touch sensitive surface 104 can be associated with (e.g., overlaid on) a display component 108 (display comp. 108), which can comprise a display screen that can present visual and/or textual content to a user. The touch sensitive surface 104 can have a size and shape that can be coextensive with or can correspond to, or at least can be substantially coextensive with or can substantially correspond to, the size and shape of a presentation area of the display screen of the display component 108.

The touch sensitive device 100 also can comprise a sensor component 110 (sensor comp. 110) that can comprise a set of sensors, wherein respective sensors of the set of sensors can sense respective conditions (e.g., contact or hover conditions, pressure conditions, and/or motion conditions associated with the device 100, . . . ) of or associated with the touch sensitive device 100. The set of sensors of the sensor component 110 can comprise surface-related sensors 112 (e.g., touch sensors) that can be part of or associated with the touch sensing component 102 and the touch sensitive surface 104. The surface-related sensors 112 can be configured to sense when an object(s) 106 is in contact with the touch sensitive surface 104 and generate sensor data, such as touch surface data (e.g., touch surface or touch screen data), relating to contact with the touch sensitive surface 104 by the object(s) 106, as more fully described herein. In some embodiments, the surface-related sensors 112 can sense when an object(s) 106 is in proximity to (e.g., is hovering over and/or in proximity to) the touch sensitive surface 104. The sensor data can be employed to facilitate determining a classification relating to a contact or an association (e.g., hover) of an object(s) 106 with the touch sensitive surface 104, as more fully described herein.

The set of sensors of the sensor component 110 also can include other sensors that can be configured to sense various conditions of or associated with the device 100. In accordance with various embodiments, the sensor component 110 can comprise an ultrasound component 114 (ultrasound comp. 114) comprising an ultrasonic sensor, an accelerometer component 116 (acc. comp. 116) comprising one or more accelerometers, a gyroscope component 118 (gyro. comp. 118) comprising one or more gyroscopes, an IMU 120, and/or other sensors. These other sensors (e.g., ultrasound component 114, accelerometer component 116, gyroscope component 118, IMU 120, . . . ) can sense or detect motion (e.g., movement) of an object 106 in relation to the device 100, orientation of the device 100 or the object 106, a distance of the object 106 from the device 100 (e.g., a distance of the object 106 from the touch sensitive surface 104), and/or other conditions of or associated with the device 100 or object 106, as more fully described herein. The other sensor data can be employed to facilitate determining a classification relating to a contact (e.g., touch) or an association (e.g., hover) of an object(s) 106 with respect to the touch sensitive surface 104, as more fully described herein.

In some embodiments, the touch sensitive device 100 can comprise a classification component 122 (class. comp. 122) that can classify or determine touch or hover interactions of objects 106 with the touch sensitive surface 104 based at least in part on the results of analyzing sensor data received from the sensor component 110, in accordance with the defined classification criteria. The classification component 122 can monitor and receive sensor data (e.g., data streams from the various sensors of the sensor component 110), such as touch surface data, associated with the touch sensitive surface 104 obtained from the surface-related sensors 112, other sensor data (e.g., ultrasound data, accelerometer data, gyroscope data, and/or IMU data, . . . ) obtained from the other sensors, and/or metadata associated with the device 100. The classification component 122 can monitor the sensor data and the other sensor data to facilitate detecting touch or hover interactions or touch interactions of an object 106 with the touch sensitive surface 104 of the device 100. The classification component 122 can analyze the touch surface data, the other sensor data, and/or the metadata, and can generate analysis results based at least in part on the analysis of such data.

In some embodiments, as part of the analysis of the touch surface data (e.g., touch screen data), the other sensor data (e.g., ultrasound data, accelerometer data, gyroscope data, and/or IMU data, . . . ), and/or the metadata, the classification component 122 can extract characteristic information (e.g., information regarding or indicating characteristics, features, and/or structures relating to the touch or hover interaction) from the touch surface data, the other sensor data, and/or the metadata. For instance, the classification component 122 can utilize desired algorithms (e.g., machine learning algorithms relating to identifying characteristics or features regarding touch or hover interactions of the object 106 with respect to the touch sensitive surface 104 and associated touch display screen) to facilitate identifying and extracting the characteristic information from the touch surface data, the other sensor data, and/or the metadata. The classification component 122 can utilize the characteristic information to discriminate or distinguish between different types of touch or hover interactions (e.g., unintentional touch or hover interaction, or intentional touch interaction)

of objects 106 (e.g., a finger(s) of the user, ear or face of the user, a palm of the user, another body part of the user, a stylus, or another type of object) with the touch sensitive surface 104.

In certain embodiments, as part of the analysis of the sensor data, the classification component 122 can utilize pattern analysis, including pattern recognition analysis, techniques, tools, and algorithms, to identify or determine patterns relating to the touch or hover interactions (e.g., patterns of contact or association (e.g., hovering) relating to the touch or hover interaction) for an object(s) 106 with the touch sensitive surface 104, in accordance with the defined classification criteria, as more fully described herein. For instance, as part of the pattern analysis, the classification component 122 can compare a pattern(s) relating to a touch or hover interaction of an object 106 with the touch sensitive surface 104 to known patterns for touch or hover interactions, such as known patterns for various types of intentional touch interactions and known patterns for various types of unintentional touch or hover interactions, to facilitate determining, based at least in part on the results of such pattern analysis (e.g., comparing of patterns), whether the touch or hover interaction is an intentional touch interaction or an unintentional touch or hover interaction and/or the particular type of touch or hover interaction (e.g., intentional finger touch, unintentional finger touch, unintentional ear (or face) touch, or unintentional palm touch, . . . ).

It can be desirable to detect and/or classify interactions, such as hover interactions, of an object 106 with the touch sensitive surface 104, and/or other characteristics of such interactions, before the object 106 comes into contact with the touch sensitive surface 104 or even if the object 106 ultimately does not come into contact with the touch sensitive surface 104. Detection and classification of such interactions can enable the device 100 (e.g., operations management component 124 (op. mgmt. comp. 124)) to make desirable decisions and take desirable actions with regard to operation of the device 100, including the touch sensitive surface 104 and display screen of the display component 108, as more fully described herein. In accordance with various embodiments, the device 100 can utilize the ultrasound component 114 to generate ultrasound audio signals and receive reflected ultrasound audio signals that have been reflected off of an object 106 in proximity to the touch sensitive surface 104 to facilitate detecting that the object 106 is in proximity to the touch sensitive surface 104, determining whether the object 106 is moving toward the touch sensitive surface 104, determining whether the object 106 is moving away from the touch sensitive surface 104, determining whether the object 106 is not moving in relation to the touch sensitive surface 104, determining a classification of the hover interaction (or impending touch interaction) of the object 106 with the touch sensitive surface 104, and/or other characteristics associated with the hover interaction of the object 106 with the touch sensitive surface 104.

For instance, the ultrasound component 114 can generate an audio signal, which can comprise at least a first frequency (e.g., a first ultrasonic frequency). For example, the audio signal can be an ultrasonic audio signal. The device 100 can comprise one or more speakers, such as speaker (spkr) 126, 128, and/or 130, that can be utilized to emit the audio signal 202 from the device 100. The speaker 126 can be located in proximity to a top portion of the touch sensitive surface 104 on the side (e.g., face) of the device 100 where the touch sensitive surface 104 is located. Speakers 128 and 130 can be located at or near the bottom side of the device 100. In some embodiments, the ultrasound component 114 can emit the audio signal 202 via one speaker (e.g., speaker 126 on the face of the device 100). In other embodiments, the ultrasound component 114 can emit the audio signal 202 via multiple speakers (e.g., speakers 126, 128, and/or 130).

When an object 106 is located in proximity to the touch sensitive surface 104, and/or is moving in relation to the touch sensitive surface 104, the audio signal 202 can hit the surface of the object 106 and can produce a reflected audio signal 204 that can be reflected off of the surface of the object 106 back towards the device 100. If the object 106 is moving in relation to the touch sensitive surface 104, the reflected audio signal 204 can have a different frequency (e.g., a higher or lower frequency), or different distribution of frequencies, than the frequency (e.g., first frequency) or distribution of frequencies of the audio signal 202 emitted by the device 100 due to a frequency shift (e.g., Doppler shift) resulting from the Doppler effect.

The device 100 also can comprise one or more microphones, such as microphone (mic) 132, 134, and/or 136, that can sense or detect the reflected audio signal 204, wherein the reflected audio signal can have at least a second frequency. The reflected audio signal 204 can be a reflected ultrasonic audio signal. Typically, the second frequency of the reflected audio signal 204 can be higher or lower than the first frequency of the audio signal 202 if the object 106 is moving towards or moving away from the touch sensitive surface 104, respectively, and the second frequency can be the same as the first frequency if the object 106 is not moving in relation to the touch sensitive surface 104. The ultrasound component 114 can receive the detected reflected audio signal 204 via the one or more microphones (e.g., microphone(s) 132, 134, and/or 136).

It is to be appreciated and understood that, while the audio signal 202 is described as being emitted from speaker 126, alternatively or additionally, the audio signal 202 can be emitted from speaker 128 and/or speaker 130. It also is to be appreciated and understood that, while the reflected audio signal 204 is described as being sensed, detected, and/or received by the microphone 136, alternatively or additionally, the reflected audio signal 204 (or another reflected audio signal reflected off of the object 106) can be sensed, detected, and/or received by microphone 132 and/or microphone 134.

The classification component 122 can receive information (e.g., sensor data) regarding the audio signal 202 and/or the reflected audio signal 204 from the ultrasound component 114. The classification component 122 can analyze the audio signal 202 and/or the reflected audio signal 204 to facilitate determining a movement status of the object 106 in relation to the touch sensitive surface 104. For instance, the classification component 122 can determine a movement status of the object 106 in relation to the touch sensitive surface 104, based at least in part on a frequency shift between the first frequency of the audio signal 202 and the second frequency of the reflected audio signal 204. The classification component 122 can utilize the analysis results from analyzing the audio signal 202 and/or reflected audio signal 204, including the determined movement status of the object 106 in relation to the touch sensitive surface 104, to classify or facilitate classifying the interaction of the object 106 with the touch sensitive surface 104. For instance, based at least in part on the analysis results obtained from analyzing the audio signal 202 and/or reflected audio signal 204, including the determined movement status of the object 106 in relation to the touch sensitive surface 104, and/or other analysis results determined from other sensor data (e.g., touch surface data, accelerometer data, gyroscope data, or IMU data), the classification component 122 can classify the interaction (e.g., hover interaction, impending touch interaction, or touch interaction) of the object 106 with the touch sensitive surface 104.

To facilitate enhancing the detection of movement of an object 106 in relation to the touch sensitive surface 104 and classification of an interaction (e.g., hover or touch interaction) of the object 106 with the touch sensitive surface 104, the ultrasound component 114 can generate an audio signal 202 comprising a distribution (e.g., first distribution) of frequencies (e.g., ultrasonic frequencies). Using audio signals with multiple frequencies can enable the classification component 122 to better gauge the movement or interaction of the object 106 in relation to the touch sensitive surface 104 and/or distinguish between different types of movement or different types of interactions of an object 106 in relation to the touch sensitive surface 104.

For instance, the ultrasound component 114 can generate an audio signal 202, comprising a first distribution of frequencies (e.g., a first statistical distribution of frequencies). The ultrasound component 114 can emit the audio signal 202 via one or more speakers (e.g., speaker(s) 126, 128, and/or 130) of the device 100 (e.g., toward the object 106). The audio signal 202 can bounce or be reflected off of an object 106, if the object 106 is in proximity to (e.g., is within a defined distance of) the touch sensitive surface 104, wherein the reflected audio signal 204 can comprise a second distribution of frequencies. Typically, with regard to a particular frequency of an emitted audio signal 202 (e.g., a particular frequency of the first distribution of frequencies of the emitted audio signal 202), a corresponding frequency of the reflected audio signal 204 (e.g., a corresponding frequency of the second distribution of frequencies of the reflected audio signal 204) can be higher or lower than the particular frequency of the audio signal 202 if the object 106 is moving towards or moving away from the touch sensitive surface 104, respectively, and the corresponding frequency can be the same as the particular frequency if the object 106 is not moving in relation to the touch sensitive surface 104. The corresponding frequency of the reflected audio signal 204 can be a frequency that can correspond to, and be the frequency that results from, the reflection of the portion of the audio signal 202 having the particular frequency off of the object 106. The one or more microphones (e.g., microphone(s) 132, 134, and/or 136) can receive, sense, and/or detect the reflected audio signal 204 comprising the second distribution of frequencies. The ultrasound component 114 can receive the reflected audio signal 204 via the one or more microphones (e.g., microphone(s) 132, 134, and/or 136).

The classification component 122 can analyze the audio signal 202 and the reflected audio signal 204 to facilitate determining a movement status of the object 106 in relation to, and/or classifying an interaction of the object 106 with, the touch sensitive surface 104. In some embodiments, the classification component 122 can determine a movement status of the object 106 in relation to the touch sensitive surface 104, based at least in part on a distribution of frequency shifts between the first distribution of frequencies of the audio signal 202 and the second distribution of frequencies of the reflected audio signal 204. In other embodiments, the classification component 122 can determine a classification of the interaction (e.g., hover interaction or (impending) touch interaction) of the object 106 with the touch sensitive surface 104 based at least in part on the results of the analysis of the audio signal 202 and/or reflected audio signal 204. In still other embodiments, the classification component 122 can determine a classification of the interaction (e.g., hover interaction or (impending) touch interaction) of the object 106 with the touch sensitive surface 104 based at least in part on the results of the analysis of the audio signal 202 and/or reflected audio signal 204 and/or other analysis results determined from the analysis of other sensor data (e.g., touch surface data, accelerometer data, gyroscope data, and/or IMU data) received by the classification component 122 from other sensors of the sensor component 110.

For instance, if a distribution of frequency shifts between the first distribution of frequencies of the audio signal 202 and the second distribution of frequencies of the reflected audio signal 204 comprises a subset (e.g., a concentration) of frequency shifts that are lower (e.g., a concentration of frequencies of the reflected audio signal are shifted lower than the corresponding frequencies of the audio signal), this can indicate that the object 106 is moving away from the touch sensitive surface 104, and/or can indicate that the object 106 is moving away from a particular location of the touch sensitive surface 104 (e.g., moving away from a top portion of, a center portion of, a bottom portion of, or a particular button or control on or associated with the touch sensitive surface 104), and/or can indicate the type of object 106 (e.g., a finger(s) of the user, an ear and/or face of the user, a palm of the user, or a stylus, . . . ).

If, instead, a distribution of frequency shifts between the first distribution of frequencies of the audio signal 202 and the second distribution of frequencies of the reflected audio signal 204 comprises a subset (e.g., a concentration) of frequency shifts that are higher (e.g., a concentration of frequencies of the reflected audio signal 204 are shifted higher than the corresponding frequencies of the audio signal 202), this can indicate that the object 106 is moving closer to the touch sensitive surface 104, and/or can indicate that the object 106 is moving towards a particular location (e.g., a top portion of, a center portion of, a bottom portion of, or a particular button or control on or associated with) on the touch sensitive surface 104, and/or can indicate the type of object 106 (e.g., a finger(s) of the user, an ear and/or face of the user, a palm of the user, or a stylus, . . . ).

For instance, respective (e.g., different) distributions of frequency shifts between a distribution of frequencies of an audio signal 202 and another distribution of frequencies of a reflected audio signal 204 (e.g., reflected off of an object 106) can indicate respective locations (e.g., a top portion of, a center portion of, a bottom portion of, a left side of, and/or a right side of; and/or a particular button or control on or associated with the touch sensitive surface 104) on the touch sensitive surface and/or can indicate respective types of objects (e.g., a finger(s) of the user, an ear and/or face of the user, a palm of the user, or a stylus, . . . ), based at least in part on respective types (e.g., frequency shift higher, frequency shift lower, or a combination thereof) and/or respective locations (e.g., frequency locations) of respective concentrations, and/or respective amounts, of frequency shifts of the respective distributions of frequency shifts. For example, a first distribution of frequency shifts between a distribution of frequencies of an audio signal 202 and another distribution of frequencies of a reflected audio signal 204 (e.g., reflected off of an object 106) can indicate that a finger of a user is moving toward a center-right portion (e.g., a button or control in the center-right portion) of the touch sensitive surface 104. The classification component 122 can analyze the ultrasound data (e.g., the first distribution of frequency shifts, the distribution of frequencies of the audio signal 202, and/or the other distribution of frequencies of the reflected audio signal 204). Based at least in part on the results of such analysis of the ultrasound data (and the training of the classification component 122), the classification component 122 can classify the interaction (e.g., hover (or impending touch) interaction) with the touch sensitive surface 104 as a hover (or impending touch) interaction of the finger of the user with the center-right portion (e.g., a button or control in the center-right portion) of the touch sensitive surface 104, and/or that such interaction is intentional, or at least can determine that the ultrasound data indicates the hover (or impending touch) interaction of the finger of the user with the center-right portion of the touch sensitive surface 104 and/or such interaction is intentional.

As another example, a second distribution of frequency shifts between a distribution of frequencies of an audio signal 202 and another distribution of frequencies of a reflected audio signal 204 (e.g., reflected off of an object 106) can indicate that an ear of a user is moving toward a center-top portion (e.g., near the speaker 126 located in a via in the center-top portion) of the touch sensitive surface 104. The classification component 122 can analyze the ultrasound data (e.g., the second distribution of frequency shifts, the distribution of frequencies of the audio signal, and/or the other distribution of frequencies of the reflected audio signal). Based at least in part on the results of this analysis of this ultrasound data (and the training of the classification component 122), the classification component 122 can classify the interaction (e.g., hover (or impending touch) interaction) with the touch sensitive surface 104 as a hover (or impending touch) interaction of the ear of the user with the center-right portion (e.g., near the speaker 126 located in a via in the center-top portion) of the touch sensitive surface 104, and/or that such interaction is unintentional (e.g., unintentional in that the user does not intend to press or manipulate a button or control associated with the touch sensitive surface 104), or at least can determine that the ultrasound data indicates the hover (or impending touch) interaction of the ear of the user with the center-right portion of the touch sensitive surface 104 and/or such interaction is unintentional.

As still another example, a third distribution of frequency shifts between a distribution of frequencies of an audio signal 202 and another distribution of frequencies of a reflected audio signal 204 (e.g., reflected off of an object 106) can indicate that two fingers of a user are moving toward a center-left portion of the touch sensitive surface 104 (e.g., as the user picks up and grips the device 100 in the user's hand). The classification component 122 can analyze the ultrasound data (e.g., the third distribution of frequency shifts, the distribution of frequencies of the audio signal, and/or the other distribution of frequencies of the reflected audio signal). Based at least in part on the results of this analysis of this ultrasound data (and the training of the classification component 122), the classification component 122 can classify the interaction (e.g., hover (or impending touch) interaction) with the touch sensitive surface 104 as a hover (or impending touch) interaction of the two fingers of the user with the center-left portion of the touch sensitive surface 104, and/or that such interaction is unintentional, or at least can determine that the ultrasound data indicates the hover (or impending touch) interaction of the two fingers of the user with the center-left portion of the touch sensitive surface 104 and/or such interaction is unintentional.

As yet another example, a fourth distribution of frequency shifts between a distribution of frequencies of an audio signal 202 and another distribution of frequencies of a reflected audio signal 204 (e.g., reflected off of an object 106) can indicate that two fingers of a user are moving toward a center portion of the touch sensitive surface 104 (e.g., as the user is intending to perform an operation using a multi-touch gesture). The classification component 122 can analyze the ultrasound data (e.g., the fourth distribution of frequency shifts, the distribution of frequencies of the audio signal 202, and/or the other distribution of frequencies of the reflected audio signal 204). Based at least in part on the results of this analysis of such ultrasound data (and the training of the classification component 122), the classification component 122 can classify the interaction (e.g., hover (or impending touch) interaction) with the touch sensitive surface 104 as a hover (or impending touch) interaction of the two fingers of the user with the center portion of the touch sensitive surface 104, and/or that such interaction is intentional, or at least can determine that the ultrasound data indicates the hover (or impending touch) interaction of the two fingers of the user with the center portion of the touch sensitive surface 104 and/or such interaction is intentional.

In some embodiments, the classification component 122 can determine a movement status of the object 106 in relation to the touch sensitive surface 104 and/or determine a classification of the interaction (e.g., hover interaction or (impending) touch interaction) of the object 106 with the touch sensitive surface 104, based at least in part on the results of analyzing the distribution of frequencies of the reflected audio signal 204 without having to explicitly analyze the distribution of frequencies of the emitted audio signal 202 and/or the distribution of frequency shifts between the emitted audio signal 202 and the reflected audio signal 204, in accordance with the defined classification criteria. For instance, the classification component 122 can know (e.g., explicitly implicitly know) the characteristics (e.g., frequency distribution, intensity level, and/or location of emission, . . . ) of the emitted audio signal 202 (e.g., audio signal comprising a particular distribution of frequencies) without having to analyze the emitted audio signal 202. For example, the audio signal 202 emitted by the device 100 can be a same or constant audio signal that can be known by the classification component 122, or the classification component 122 can know or be made aware of when a different audio signal (e.g., different audio signal having a different distribution of frequencies) is being emitted by the device 100. The classification component 122 can analyze the reflected audio signal 204, and knowing (e.g., implicitly or explicitly knowing) the distribution of frequencies of the audio signal 202 (and/or other characteristics of the audio signal 202) and/or knowing (e.g., implicitly or explicitly knowing) the distribution of frequency shifts between the emitted audio signal 202 and the reflected audio signal 204 (e.g., from the results of analyzing the frequency distribution of the reflected audio signal 204), the classification component 122 can determine the movement status of the object 106 in relation to the touch sensitive surface 104 and/or determine the classification of the hover or touch interaction of the object 106 with the touch sensitive surface 104, based at least in part on the results of the analysis of the reflected audio signal 204.

Additionally or alternatively, the classification component 122 can be trained, as more fully described herein, to be able to determine a distribution of frequency shifts between the distribution of frequencies of the emitted audio signal 202 and the distribution of frequencies of the reflected audio signal 204, based at least in part on the results of analyzing the distribution of frequencies of the reflected audio signal 204. That is, the training of the classification component 122 can enable the classification component 122 to explicitly or implicitly know or determine the distribution of frequency shifts between the distribution of frequencies of the emitted audio signal 202 and the distribution of frequencies of the reflected audio signal 204, and/or the movement status of the object 106 in relation to the touch sensitive surface 104, and/or the classification of the interaction (e.g., hover interaction or (impending) touch interaction) of the object 106 with the touch sensitive surface 104, based at least in part on the results of the classification component 122 analyzing the distribution of frequencies of the reflected audio signal 204.

As disclosed, the device 100 can comprise one or more microphones, such as microphone(s) 132, 134, and/or 136, that can receive, sense, and/or detect a reflected audio signal that has been reflected off of an object 106. In certain embodiments, the ultrasound component 114 can emit an audio signal 202 via a speaker (e.g., speaker 126), and, in response to the audio signal 202 interacting with (e.g., reflecting off of) an object 106 to produce reflected audio signals, respective microphones, such as microphone 132, microphone 134, and/or microphone 136) can sense and/or receive respective reflected audio signals. For instance, microphone 136 can sense and/or receive the reflected audio signal 204 comprising first characteristics and microphone 132 can receive another reflected audio signal 206 comprising second characteristics. The characteristics of the reflected audio signals 204 and 206 can relate to, for example, an intensity level of a reflected audio signal as received by a microphone, a time of arrival of a reflected audio signal at a microphone, an amount of time between emission of the audio signal 202 and the time of arrival of a reflected audio signal at a microphone, and/or a frequency or distribution of frequencies of a reflected audio signal. The ultrasound component 114 and/or classification component 122 can receive sensor data relating to the reflected audio signal 204 comprising the first characteristics and the other reflected audio signal 206 comprising the second characteristics from the microphones 136 and 132, respectively.

The classification component 122 can analyze the sensor data relating to the reflected audio signal 204 comprising the first characteristics and the other reflected audio signal 206 comprising the second characteristics. Based at least in part on the results of analyzing such sensor data, the classification component 122 can determine the first characteristics of the reflected audio signal 204 and the second characteristics of the other reflected audio signal 206, and can determine a difference in intensity levels between the reflected audio signal 204 and the other reflected audio signal 206, a difference in times of arrival between the reflected audio signal 204 and the other reflected audio signal 206, a difference in amounts of time between emission of the audio signal 202 and the time of arrival of the reflected audio signal 204 and the time of arrival of the other reflected audio signal 206, a difference in frequencies of frequency distributions of the reflected audio signal 204 and the other reflected audio signal 206, and/or other differences between other characteristics of the first characteristics and second characteristics. As part of the analysis, the classification component 122 also can know or determine (e.g., via analysis of the audio signal 202) characteristics of the audio signal 202 (e.g., intensity level of the audio signal 202, time of emission of the audio signal 202, and/or frequency or frequency distribution of the audio signal 202, . . . ).

Based at least in part on the analysis results, the classification component 122 can determine a movement status of the object 106 in relation to the touch sensitive surface 104, classify a hover or touch (or impending touch) interaction of the object 106 with the touch sensitive surface 104, including determining or classifying the type of object that the object 106 is, determine a distance (e.g., the proximity) between the object 106 and the touch sensitive surface 104, and/or determine the location on the touch sensitive surface 104 (and/or button or control associated with the touch sensitive surface 104 and associated display screen) that the object 106 is hovering over or is expected to touch. For instance, if the first intensity level of the reflected audio signal 204 is stronger or higher than the second intensity level of the other reflected audio signal 206, this can indicate that the object 106 is closer to the location of the microphone 136 than the location of the microphone 132, and the classification component 122 can determine or infer that the object 106 is closer to the location of the microphone 136 than the location of the microphone 132, and accordingly, the object 106 can be closer to a portion of the touch sensitive surface 104 that is in proximity to the microphone 136 than another portion of the touch sensitive surface 104 that is in proximity to the microphone 132. Conversely, if the second intensity level of the reflected audio signal 204 is weaker or lower than the second intensity level of the other reflected audio signal 206, this can indicate that the object 106 is closer to the location of the microphone 132 than the location of the microphone 136, and the classification component 122 can determine or infer that the object 106 is closer to the location of the microphone 132 than the location of the microphone 136, and accordingly, the object 106 can be closer to the other portion of the touch sensitive surface 104 that is in proximity to the microphone 132 than the portion of the touch sensitive surface 104 that is in proximity to the microphone 136.

As another example, based at least in part on the difference in intensity levels between the emitted audio signal 202 and the reflected audio signal 204 and other reflected audio signal 206, the classification component 122 can determine, infer, or estimate the distance between the object 106 and the touch sensitive surface 104. For instance, if the respective intensity levels of the reflected audio signal 204 and other reflected audio signal 206 are relatively low, as compared to the intensity level of the emitted audio signal 202, this can indicate that the object 106 is located relatively far away from the touch sensitive surface 104, and the classification component 122 can determine or infer that the object 106 is located relatively far away from the touch sensitive surface 104, and can determine or estimate the distance between the object 106 and touch sensitive surface 104 based at least in part on the differences in intensity levels between the emitted audio signal 202 and the reflected audio signal 204 and other reflected audio signal 206. Also, if the respective intensity levels of the reflected audio signal 204 and/or other reflected audio signal 206 are relatively high (e.g., relatively close to being as strong or as high as the intensity level of the emitted audio signal 202), as compared to the intensity level of the emitted audio signal 202, this can indicate that the object 106 is located relatively close to the touch sensitive surface 104, and the classification component 122 can determine or infer that the object 106 is located relatively close to the touch sensitive surface 104, and can determine or estimate the distance between the object 106 and touch sensitive surface 104 based at least in part on the differences in intensity levels between the emitted audio signal 202 and the reflected audio signal 204 and other reflected audio signal 206.

It is noted that, while the intensity level of the reflected audio signal 206 can be indicative of the location of the object 106 in relation to the touch sensitive surface 104 and indicative of the distance of the object 106 from the touch display screen 104, one or more other factors can impact the intensity level, and the classification component 122 can take these factors into account during the analysis of the reflected audio signal 204, the other reflected audio signal 206, and/or the emitted audio signal 202. For instance, often with regard to an intensity level of a reflected audio signal, as the distance between the object and the sensor (e.g., microphone) (and associated touch sensitive surface) decreases, the intensity of the reflected audio signal can increase, and conversely, as the distance between the object and the sensor (and associated touch sensitive surface) increases, the intensity of the reflected audio signal can decrease. However, due to other factors, such as, for example, interference or other effects that can impact the reflected audio signal, including its intensity level, there can be circumstances where the change in intensity level in relation to distance of the object from the touch sensitive surface may not be uniform and/or circumstances where the intensity level of the reflected audio signal can be lower when the object is closer to the touch sensitive surface and higher when the object is farther away from the touch sensitive surface. The classification component 122 can take these other factors into account when determining the location of the object 106 in relation to the touch sensitive surface 104 and determining the distance of the object 106 from the touch display screen 104. For example, the classification component 122 can perform analysis on other sensor data (e.g., accelerometer data, gyroscope data, IMU data, and/or vibro-acoustic data, . . . ) to facilitate determining the location of the object 106 in relation to the touch sensitive surface 104, determining the distance of the object 106 from the touch sensitive surface 104, and/or verifying whether the results of the analysis of the ultrasound data (e.g., reflected audio signal(s) and/or emitted audio signal) with regard to the location and/or distance of the object 106 with respect to the touch sensitive surface 104 are desirably accurate. As another example, the classification component 122 can be trained (e.g., using machine learning techniques and algorithms) to take such other factors (e.g., interference or other effects) into account when determining the location of the object 106 in relation to the touch sensitive surface 104 and/or determining the distance of the object 106 from the touch sensitive surface 104 based at least in part on the reflected audio signal 204, the other reflected audio signal 206, and/or the emitted audio signal 202.

As still another example, based at least in part on the difference in a first time of arrival of the reflected audio signal 204 to the microphone 136 and a second time of arrival of the other reflected audio signal 206 to the microphone 132, the classification component 122 can classify a hover or touch (or impending touch) interaction of the object 106 with the touch sensitive surface 104, including determining or classifying the type of object that the object 106 is, determine a distance (e.g., the proximity) between the object 106 and the touch sensitive surface 104, and/or determine the location on the touch sensitive surface 104 (and/or button or control associated with the touch sensitive surface 104 and associated display screen) that the object 106 is hovering over or is expected to touch.

For instance, if the first time of arrival of the reflected audio signal 204 at the microphone 136 occurs before the second time of arrival of the other reflected audio signal 206 at the microphone 132, this can indicate that the object 106 is closer to the location of the microphone 136 than the location of the microphone 132, and the classification component 122 can determine or infer that the object 106 is closer to the location of the microphone 136 than the location of the microphone 132, and accordingly, the object 106 can be closer to a portion of the touch sensitive surface 104 that is in proximity to the microphone 136 than another portion of the touch sensitive surface 104 that is in proximity to the microphone 132. Conversely, if the first time of arrival of the reflected audio signal 204 at the microphone 136 occurs after the second time of arrival of the other reflected audio signal 206 at the microphone 132, this can indicate that the object 106 is closer to the location of the microphone 132 than the location of the microphone 136, and the classification component 122 can determine or infer that the object 106 is closer to the location of the microphone 132 than the location of the microphone 136, and accordingly, the object 106 can be closer to the other portion of the touch sensitive surface 104 that is in proximity to the microphone 132 than the portion of the touch sensitive surface 104 that is in proximity to the microphone 136.

In some embodiments, the device 100, employing the classification component 122, can fuse the use of multiple (e.g., two or more) object sensing technologies (e.g., ultrasound technology, touch sensor technology, accelerometer technology, gyroscope technology, and/or IMU technology) to enhance the detection of objects 106, identification of objects 106, and classifications of touch or hover interactions of objects 106 with the touch sensitive surface 104. For instance, the classification component 122 can receive ultrasound data from the ultrasound component 114, touch surface data from the surface-related sensors 112, accelerometer data from the accelerometer component 116, gyroscope data from the gyroscope component 118, and/or IMU data from the IMU 120. The classification component 122, employing one or more classification engines, can analyze the ultrasound data, touch surface data, accelerometer data, gyroscope data, and/or IMU data. Based at least in part on such analysis, the classification component 122 can extract respective characteristic information (e.g., information regarding or indicating characteristics, features, and/or structures) relating to the touch or hover interaction from the respective types of sensor data (e.g., ultrasound data, touch surface data, accelerometer data, gyroscope data, and/or IMU data). For instance, the classification component 122 can analyze each type of sensor data and, for each type of sensor data, can extract characteristic information relating to the touch or hover interaction from that particular sensor data. In other embodiments, based at least in part on the analysis, the classification component 122 can extract characteristic information relating to the touch or hover interaction from the sensor data as a whole (e.g., a combined analysis of, and extraction of characteristic information from, the sensor data as a whole). The characteristic information can comprise, for example, features, shapes, dimensions, spectral centroid, spectral density, spherical harmonics, total average spectral energy, log spectral band ratios, and/or other features related to the contact or hovering of the object 106 with the touch sensitive surface 104, with respect to the time domain or frequency domain, respectively.

The classification component 122 can utilize (e.g., analyze) the characteristic information to discriminate or distinguish between different types of touch or hover interactions (e.g., unintentional touch or hover interaction, or intentional touch interaction) of objects 106 (e.g., finger(s), ear or face, palm, or other body part, of the user; a stylus; or another type of object) with the touch sensitive surface 104. In certain embodiments, the classification component 122 can generate a representational image (e.g., frame image) of (e.g., corresponding to) the respective characteristic information relating to a touch or hover interaction of an object 106 with the touch sensitive surface 104 based at least in part on (e.g., from) the respective characteristic information extracted from the ultrasound data, touch surface data, and/or other sensor data. The representational image can be or comprise a pattern relating to (e.g., representing or corresponding to) the touch or hover interaction of the object 106 with the touch sensitive surface 104.

The classification component 122 can analyze the representational image to facilitate classifying the touch or hover interaction of the object 106 with the touch sensitive surface 104, in accordance with the defined classification criteria. In some embodiments, the classification component 122 can evaluate or compare the characteristics (e.g., features) of the representational image to respective known characteristics that respectively can indicate whether the touch or hover interaction is intentional or unintentional and/or whether the object 106 is a finger(s) of the user, an ear of the user, a face of the user, a palm of the user, a stylus, or other object, and/or can provide one or more other indications that can facilitate classifying the touch or hover interaction. For instance, as part of the analysis, the classification component 122, employing one or more classification engines (e.g., one or more trained classification engines), can perform pattern analysis to compare the pattern(s) of the representational image relating to the touch or hover interaction of the object 106 with the touch sensitive surface 104 to known patterns for touch or hover interactions, such as, for example, known patterns for various types of intentional touch interactions and known patterns for various types of unintentional touch or hover interactions. Based at least in part on the results of such pattern analysis, the classification component 122 can determine whether the touch or hover interaction is an intentional touch interaction or an unintentional touch or hover interaction and/or the particular type of touch or hover interaction (e.g., intentional finger touch, unintentional finger touch, unintentional ear touch, or unintentional palm touch, . . . ).

In accordance with various embodiments, the classification component 122 can comprise one or more classification engines that can analyze sensor data and determine classifications of touch or hover interactions, such as described herein. For example, the classification component 122 can comprise a first classification engine that can analyze one or more types of sensor data (e.g., touch surface data, ultrasound data, accelerometer data, and/or other sensor data) relating to a touch or hover interaction (or another touch or hover interaction) and determine a first classification of the touch or hover interaction based at least in part on the results of analyzing such sensor data; a second classification engine that can analyze one or more other types of sensor data (e.g., gyroscope data, and/or other sensor data) relating to a touch or hover interaction and determine a second classification of the touch or hover interaction (or a classification of another touch or hover interaction) based at least in part on the results of analyzing such other types of sensor data; and/or a third classification engine that can analyze one or more other types of sensor data (e.g., vibro-acoustic data, and/or other sensor data) relating to the touch or hover interaction (or another touch or hover interaction) and determine a third classification of the touch or hover interaction (or a classification of the other touch or hover interaction) based at least in part on the results of analyzing such other sensor data. One of the classification engines of the classification component 122 can receive the respective classifications of a touch or hover interaction from respective classification engines, can analyze the respective classifications, and can determine the classification of the touch or hover interaction based at least in part on the result of analyzing the respective classifications, in accordance with the defined classification criteria. The use of multiple classification engines to classify touch or hover interactions can enhance (e.g., improve) the accuracy of classifying touch or hover interactions of objects 106 in contact or association (e.g., hovering) with the touch sensitive surface 104. In certain embodiments, the respective classification engines can operate in parallel (e.g., simultaneously) to process (e.g., analyze) respective types of sensor data to determine respective classifications of a touch or hover interaction.

It is to be appreciated and understood that, in accordance with various embodiments, the disclosed subject matter can deploy classification engines, as desired, to facilitate improving the accuracy of classifications of touch or hover interactions relating to objects 106 with respect to the touch sensitive surface 104 and/or to facilitate improving the speed of performing the classifications of touch or hover interactions relating to objects 106 with respect to the touch sensitive surface 104. In some embodiments, more than one classification engine can be utilized to analyze the same type of data (e.g., ultrasound data) from a same sensor (e.g., ultrasound sensor of the ultrasound component 114). In other embodiments, a first number (e.g., five) types of sensor data from a first number of sensors can be processed by a second number (e.g., three) of classification engines to facilitate classifying touch or hover interactions relating to objects 106 with respect to the touch sensitive surface 104, wherein respective sensor data from the respective sensors can be distributed among respective classification engines, as desired, for processing.

With further regard to the operations management component 124 of the device 100, the operations management component 124 can be associated with (e.g., communicatively connected to) the classification component 122, the touch sensing component 102, the sensor component 110, the display screen of the display component 108, and/or other components of the device 100. As more fully described herein, the operations management component 124 can control functions associated with the touch sensitive surface 104, the display screen, processors (e.g., application processor), and/or other components of the device 100 based at least in part on (e.g., in response to) the classification(s) of a touch or hover interaction(s) of the object(s) 106 with the device 100, wherein the functions can comprise, for example, enabling a touch sensitive function of the touch sensitive surface 104 and associated display screen and/or another function of the device 100, disabling the touch sensitive function of the touch sensitive surface 104 and associated display screen and/or another function of the device 100, switching (e.g., transitioning) the touch sensitive surface 104 to an unlocked state (or maintaining the touch sensitive surface 104 in the unlocked state), switching the touch sensitive surface 104 to a locked state (or maintaining the touch sensitive surface 104 in the locked state), switching the display screen (e.g., touch display screen) of the device 100 to an on state (or maintaining the display screen in the on state), and/or switching the display screen to an off state (or maintaining the display screen in the off state), process and/or allow an intentional touch interaction, enable an operation(s) associated with the intentional touch interaction to be performed by the device 100 (e.g., by the touch display screen, a control, a button, and/or an application associated with the device 100, . . . ), reject an unintentional touch or hover interaction, and/or prevent an undesired operation(s) associated with the unintentional touch or hover interaction from being performed by the device 100 (e.g., by the touch display screen, control, button, and/or application, . . . ).

For example, in response to a determination that a touch interaction associated with the touch sensitive surface 104 is an unintentional touch interaction, the operations management component 124 can disable a touch sensitive function of the touch sensitive surface 104 to facilitate rejecting the unintentional touch or hover interaction such that the unintentional touching of the touch sensitive surface 104 is not able to engage or select a touch sensitive function of the touch sensitive surface 104 (e.g., prevents selection of a button or control associated with the touch sensitive surface 104 as presented on the display screen) and/or can control operation of the display screen (e.g., touch display screen) to have the display screen transition to or remain in an off state (e.g., a dark display screen). As another example, in response to a determination that a touch interaction associated with the touch sensitive surface 104 is an intentional touch interaction (e.g., intentional touch event), the operations management component 124 can enable a touch sensitive function(s) of the touch sensitive surface 104 to allow the finger(s) of the user to engage or select the touch sensitive function(s) of the touch sensitive surface 104 (e.g., enables selection of a button or control associated with the touch sensitive surface 104 as presented on the display screen) and/or can control operation of the display screen to have the display screen transition to or remain in an on state (e.g., a lit display screen).

As still another example, in response to a determination that a first touch or hover interaction associated with the touch sensitive surface 104 is an unintentional touch or hover interaction and a second touch interaction associated with the touch sensitive surface 104 is an intentional touch interaction (e.g., for simultaneous or substantially simultaneous touch or hover interactions), the operations management component 124 can reject the first touch or hover interaction as an unintentional touch or hover interaction, and can allow and process the second touch interaction as an intentional touch interaction, by respectively controlling operations of the touch sensitive surface 104, display screen, and/or other components of the device 100, as described herein. For example, the operations management component 124 can control operations of the touch sensitive device 100 to prevent certain operations associated with the unintentional touch or hover interaction from being performed by the device 100 and allow and facilitating performance of other operations associated with the intentional touch interaction by the device 100.

The device 100, by employing the classification component 122 and the ultrasound component 114, and/or by fusing the use of multiple (e.g., two or more) object sensing technologies (e.g., ultrasound technology, touch sensor technology, accelerometer technology, gyroscope technology, and/or IMU technology), can enhance the detection of objects 106, identification of objects 106, and classifications of touch or hover interactions of objects 106 with the touch sensitive surface 104. Also, the device 100, by employing the classification component 122 and the ultrasound component 114, and/or by fusing the use of multiple (e.g., two or more) object sensing technologies, can replace the functionality of an infrared proximity sensor for sensing objects in proximity to the touch sensitive surface. That is, the device 100 can provide enhanced functionality relating to detecting objects 106 in proximity to the touch sensitive surface 104 and classification of touch or hover interactions of objects 106 with the touch sensitive surface 104 without having to have or use an infrared proximity sensor. As a result, the space on the device 100 (e.g., space on or associated with the face or display screen of the device 100) that would otherwise have been taken up by the infrared proximity sensor can be utilized for other desired purposes, such as, for example, to enhance the screen size of the display screen of the device 100 (e.g., enhance or increase the ratio of the screen size of the display screen relative to the size of the touch sensitive device 100). Also, the resources of the device 100 that otherwise would have been used for the infrared proximity sensor can be used for other desired purposes.

The disclosed subject matter, in addition to rejecting undesired (e.g., unintentional) touch or hover interactions, preventing undesired operations from being performed by the device 100 in response to undesired touch or hover interactions, and obviating having to use an infrared proximity sensor, the device 100, by employing the classification component 122, the ultrasound component 114, operations management component 124, and other components of the device 100, can reduce or minimize the undesired use of resources of the device 100, including the undesired consumption of power of the battery (not shown) of the device 100 and the undesired use of processing and other operation-performing resources of the device 100. As a result, in the short term, the disclosed subject matter can conserve battery power and improve (e.g., increase or maintain) available battery power on the device 100 and can enable processing resources and other resources of the device 100 to be available for other desired uses, as compared to conventional devices (e.g., conventional devices with touch display screens or touch pads), since the resources are not being undesirably diverted to perform undesired operations in response to undesired touch or hover interactions. In the long term, the disclosed subject matter can improve or extend the battery life of the battery of the device 100, as compared to conventional devices.

Figure 3:
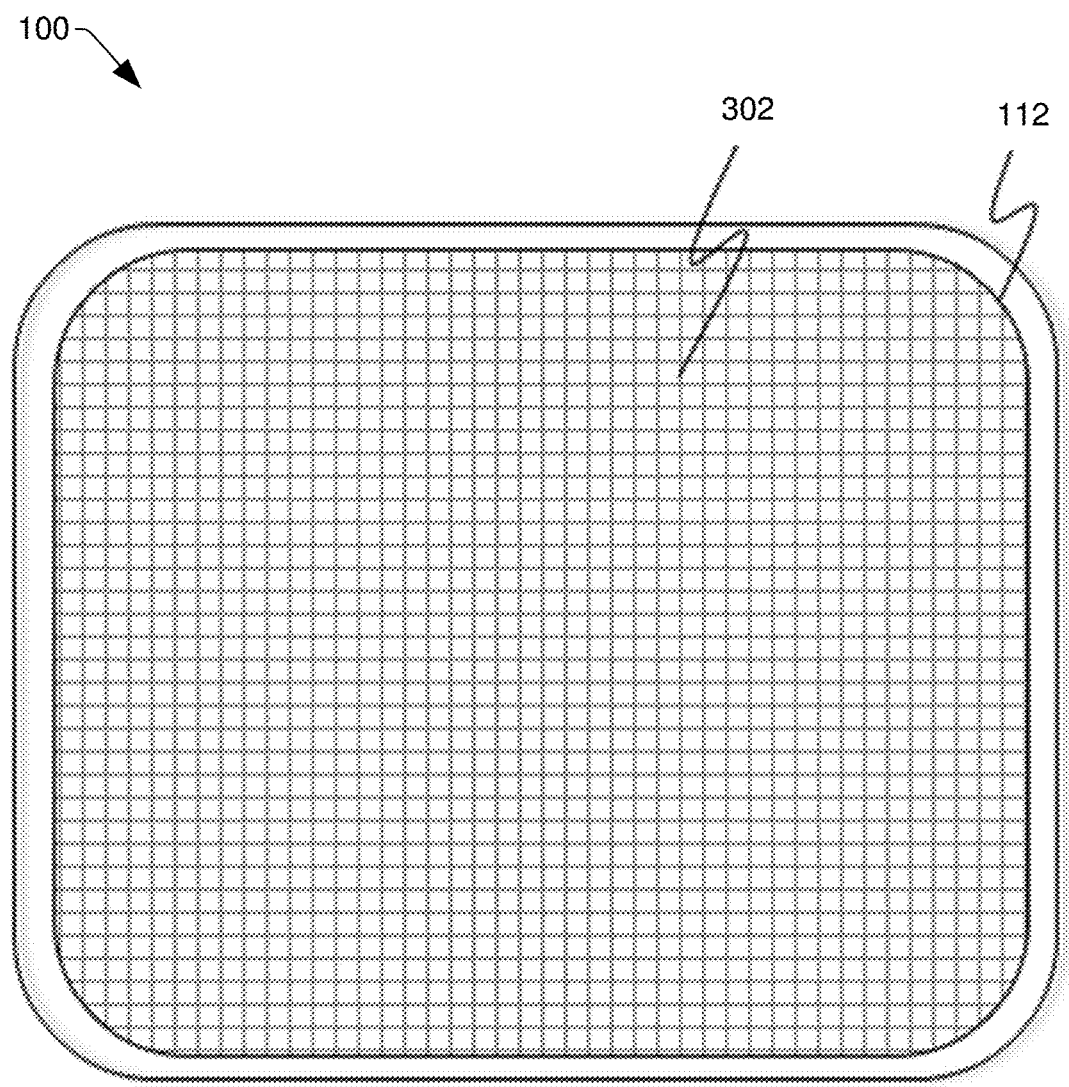
FIG. 3 depicts a diagram of a top view of the example touch sensitive device, including the touch sensitive surface, and an illustrative view of surface-related sensors in the form of a grid, in accordance with various aspects and embodiments of the disclosed subject matter.

With further regard to the touch sensitive surface 104, referring to FIG. 3 (along with FIGS. 1 and 2), FIG. 3 depicts a diagram of a top view of the example touch sensitive device 100, including the touch sensitive surface 104, and an illustrative view of surface-related sensors 112 in the form of a grid, in accordance with various aspects and embodiments of the disclosed subject matter. The touch sensitive surface 104 can comprise or be associated with the surface-related sensors 112. In some embodiments, the surface-related sensors 112 can be distributed in various locations associated with the touch sensitive surface 104 to form a sensor array 302, wherein respective surface-related sensors 112 can be associated with respective portions of the touch sensitive surface 104. For example, the surface-related sensors 112 can be distributed to in various locations associated with the touch sensitive surface 104 to form a grid (e.g., an x, y grid). It is to be appreciated and understood that such a grid formation is merely one example formation that can be employed for distributing the surface-related sensors 112 of the sensor array 302 at various locations associated with the touch sensitive surface 104, and, in accordance with other embodiments of the disclosed subject matter, the surface-related sensors 112 can be distributed in other formations (e.g., uniform or non-uniform formations) with respect to the touch sensitive surface 104.

In some embodiments, when an object(s) 106 is brought into contact with, or is in sufficiently close proximity to, a location(s) on the touch sensitive surface 104, one or more surface-related sensors 112 of the sensor array 302 that are associated with that location on the touch sensitive surface 104 can sense such contact of the object(s) 106 with the that location(s) on the touch sensitive surface 104 or sense such proximity of the object(s) 106 to that location(s) on the touch sensitive surface 104. In other embodiments, the surface-related sensors 112 of the sensor array 302 can be configured to sense contact of an object(s) 106 with the touch sensitive surface 104, with other sensors being employed to sense hovering of the object(s) 106 in proximity to the touch sensitive surface 104. In response to the one or more surface-related sensors 112 sensing or detecting the object(s) 106 in contact with or in proximity to that location(s) on the touch sensitive surface 104, the one or more surface-related sensors 112 can generate signals (e.g., sensor data) and can communicate the signals to the classification component 122 for analysis and evaluation (e.g., to facilitate determining which of the surface-related sensors 112 is in contact with the object(s) 106 or in proximity to the object(s) 106).

In some implementations, the touch sensing component 102 or the classification component 122 can sweep the surface-related sensors 112 of the sensor array 302 or can otherwise poll the surface-related sensors 112 of the sensor array 302 to facilitate obtaining respective sensor data (e.g., respective touch surface data) from respective surface-related sensors 112 of the sensor array 302, to facilitate enabling the classification component 122 to determine which portion(s) of the touch sensitive surface 104 is in contact with or in proximity to the object(s) 106 at a given time (e.g., a given moment or period of time). For example, the touch sensing component 102 or the classification component 122 can sweep the surface-related sensors 112 of the sensor array 302 or can otherwise poll the surface-related sensors 112 of the sensor array 302 every $1/15^{th}$ of a second, $1/30^{th}$ of a second, every $1/60^{th}$ of a second, every $1/100^{th}$ of a second, or at another desired rate or periodicity. The classification component 122 (or touch sensing component 102) can process and/or organize (e.g., arrange) the sensor data obtained from the surface-related sensors 112 of the sensor array 302 to generate frame data in the form of x, y dimensional data that can represent (e.g., correspond to) respective touch (or hover) interactions of an object(s) 106 with respective surface-related sensors 112 at the given time, wherein respective frame data associated with the respective surface-related sensors 112 can be or can comprise the respective sensor data of the respective surface-related sensors 112 or the respective frame data can be determined based at least in part on the respective sensor data.

With further regard to other sensors (e.g., ultrasound component 114, accelerometer component 116, gyroscope component 118, and/or IMU 120) of the sensor component 110, in some embodiments, the other sensors of the sensor component 110 can comprise one or more motion-related sensors that can be employed to detect movement of an object 106 in relation to the touch sensitive surface 104, motion of the device 100 about or along one or more axes (e.g., x-axis, y-axis, and/or z-axis), and/or other motion-related characteristics of the object 106 or device 100, as well as orientation of the device 100, and can generate sensor data (e.g., ultrasound data, accelerometer data, or other motion-related sensor data) that can correspond to the movement of the object 106, motion of the device 100, other motion-related characteristics of the object 106 or device 100, and/or orientation of the device 100, detected by the one or more motion-related sensors. For example, a multi-axis (e.g., two or three axis) motion-related sensor can generate first motion data relating to motion of the touch sensitive device along a first axis (e.g., x-axis), second motion data relating to motion of the touch sensitive device along a second axis (e.g., y-axis), and/or third motion data relating to motion of the touch sensitive device along a third axis (e.g., z-axis).

A motion-related sensor, such as an accelerometer, gyroscope, IMU, and/or other type of motion-related sensor, can be a single-axis motion-related sensor or a multiple-axis (e.g., two-axis or three-axis) motion related sensor. The one or more motion-related sensors can monitor and sense motion of the device 100 at a desired sensing rate (e.g., a second or sub-second rate). For example, a motion-related sensor can monitor and sense movement of the object 106, motion of the device 100 along one or more axes, other motion-related characteristics of the object 106 or device 100, and/or orientation of the device 100 every $1/15^{th}$ of a second, $1/30^{th}$ of a second, every $1/60^{th}$ of a second, every $1/100^{th}$ of a second, or at another desired sensing rate. In certain embodiments, the motion-related sensors can include one or more vibro-acoustic sensors that can detect and/or measure movement or vibrations of the device 100. The one or more vibro-acoustic sensors can generate motion data, comprising vibro-acoustic data, based at least in part on the detected or measured movement or vibrations of the device 100, and can provide such motion data to the classification component 122 for analysis.

In some embodiments, as motion data is generated by the motion-related sensors, that motion data can be stored in a buffer component 138 (buffer comp. 138) (e.g., buffer memory) for a desired amount of time. For instance, the buffer component 138 can store motion data (and/or touch surface data) that can cover a defined period of time (e.g., the last second, the last two seconds, the last three seconds, or another desired period of time). As an example, in response to determining that the device 100 is in an in-call state or an active state (e.g., the touch sensitive surface 104 is in an active state), the classification component 122 (or another component, such as a processor, of the device 100) can have the buffer component 138 store the motion data, the touch surface data (e.g., obtained from the surface-related sensors 112), or other desired data (e.g., orientation data) to facilitate analysis of such data by the classification component 122.

As described herein, in some embodiments, as part of the analysis of the touch surface data, ultrasound data, or other sensor data, the classification component 122 can identify and extract characteristic information (e.g., features, shapes, dimensions, spectral centroid, and/or spectral density, . . . ) related to contact or association (e.g., hovering) of an object(s) 106 with the touch sensitive surface 104 from the touch surface data, ultrasound data, or other sensor data. The classification component 122 can utilize the characteristic information (e.g., extracted features) to generate a frame image, comprising frame data, of the contact or association of the object(s) 106 with the touch sensitive surface 104. In other embodiments, the classification component 122 can analyze the touch surface data without extracting characteristic information relating to contact or association (e.g., hovering) of the object(s) 106 with the touch sensitive surface 104 from the touch surface data, ultrasound data, or other sensor data.

Figure 4:
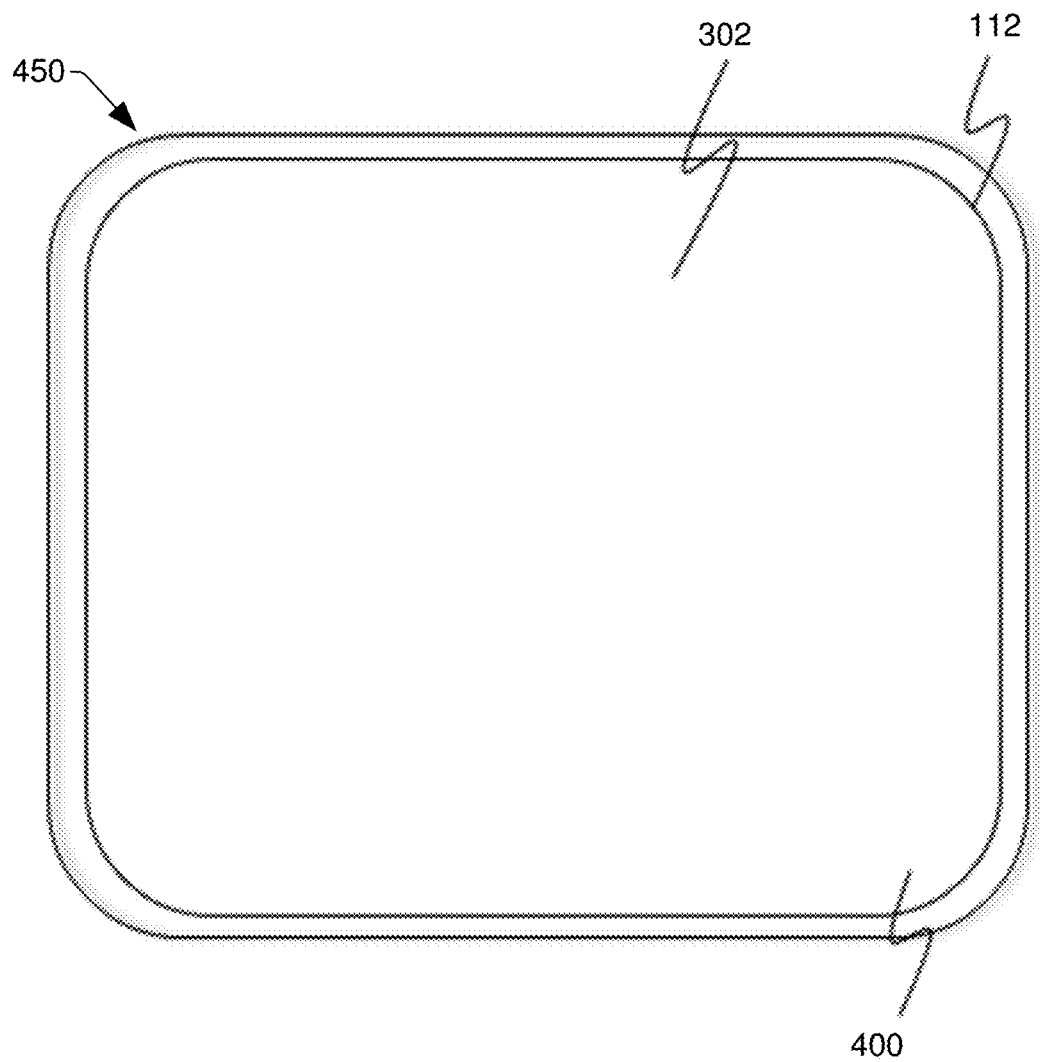
FIG. 4 presents a diagram of an example frame image as part of a visual representation of a top view of an example touch sensitive device, the frame image comprising or representing frame data associated with the touch sensitive surface, in accordance with various aspects and embodiments of the disclosed subject matter.

Frame data can be conceptually understood as providing an image or frame image that can have higher-density portions representing areas of the touch sensitive surface 104 that are in contact with (or in proximity to) an object(s) 106 and other lower-density portions representing areas of the touch sensitive surface 104 that are not in contact with (or in proximity to) an object(s). Turning briefly to FIG. 4 (along with FIGS. 1, 2, and 3), FIG. 4 presents a diagram of an example frame image 400 as part of a visual representation 450 of a top view of an example touch sensitive device 100, the frame image 400 comprising or representing frame data associated with the touch sensitive surface 104, in accordance with various aspects and embodiments of the disclosed subject matter. With respect to the example frame image 400, the surface-related sensors 112 of the sensor array 302 have not detected an object 106 in contact with or in proximity to the surface-related sensors 112 and have correspondingly generated signals (e.g., sensor data) indicating that no object has been detected in contact with or in proximity to the surface-related sensors 112. In this example frame image 400, as no objects are detected in contact with or in proximity to the touch sensitive surface 104, the frame image 400 can have the appearance illustrated in FIG. 4 with no higher-density portions (e.g., no darker colored regions) being shown in the frame image 400.

However, when objects (e.g., object 106) are brought into contact with or in proximity to the touch sensitive surface 104, a portion of the surface-related sensors 112 of the sensor array 302 that are located in the portion(s) of the touch sensitive surface 104 that is in contact with or proximity to the objects can detect such objects, and can generate sensor data representing such detection in response. The portion of the surface-related sensors 112 can communicate the sensor data to report that the objects are in contact with or proximity to the portion(s) of the touch sensitive surface 104 associated with the portion of the surface-related sensors 112, and a contrast pattern can emerge in a frame image representative of such a state of contact.

Figure 5:
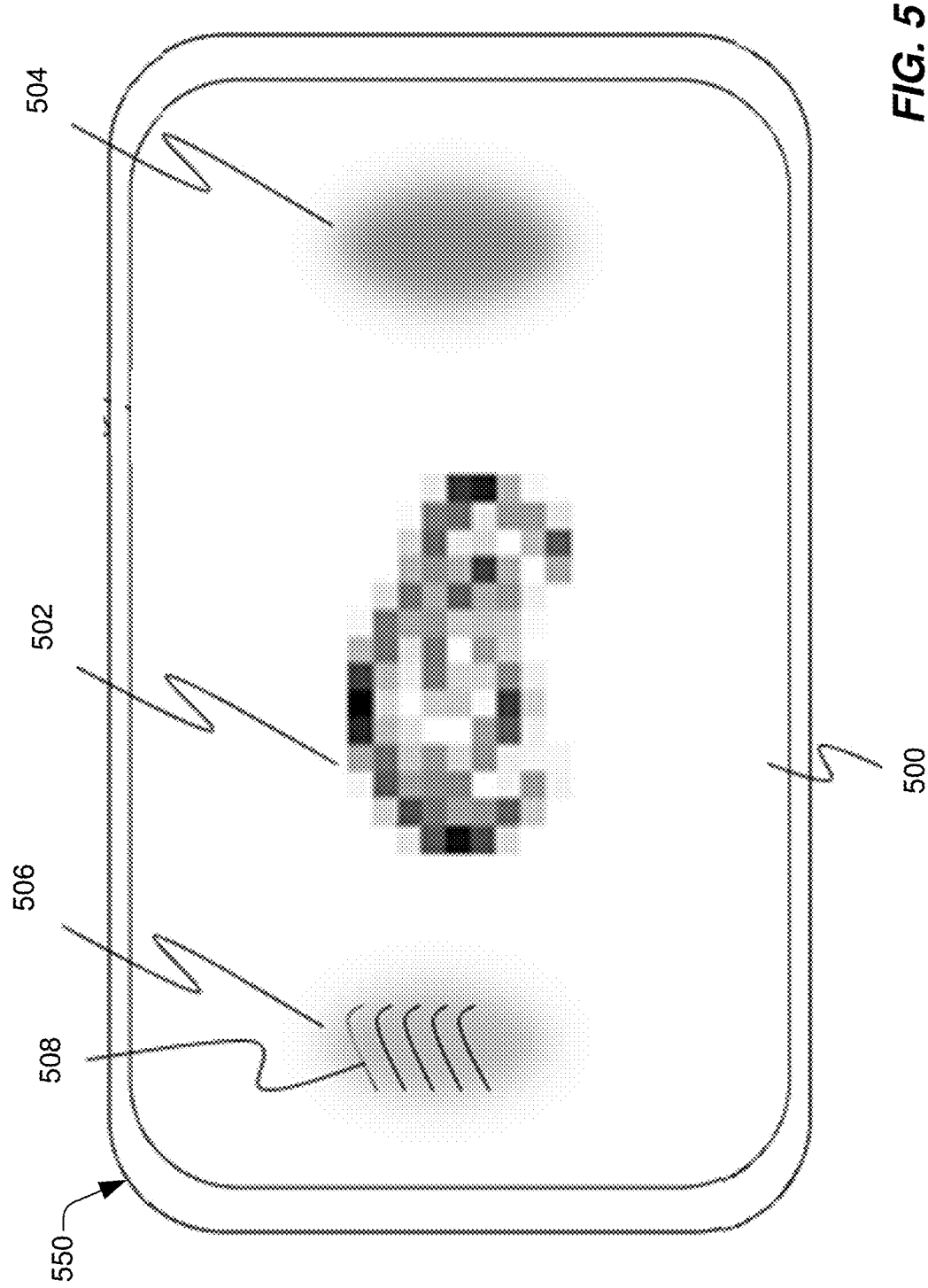
FIG. 5 illustrates a diagram of an example frame image as part of a visual representation of a top view of the touch sensitive device, wherein the example frame image can comprise or represent frame data that can be determined during a time period when sensor data for a frame is acquired by the touch sensing component and associated sensor component in connection with a user having the device near the user's ear, in accordance with various aspects and embodiments of the disclosed subject matter.
Figure 6:
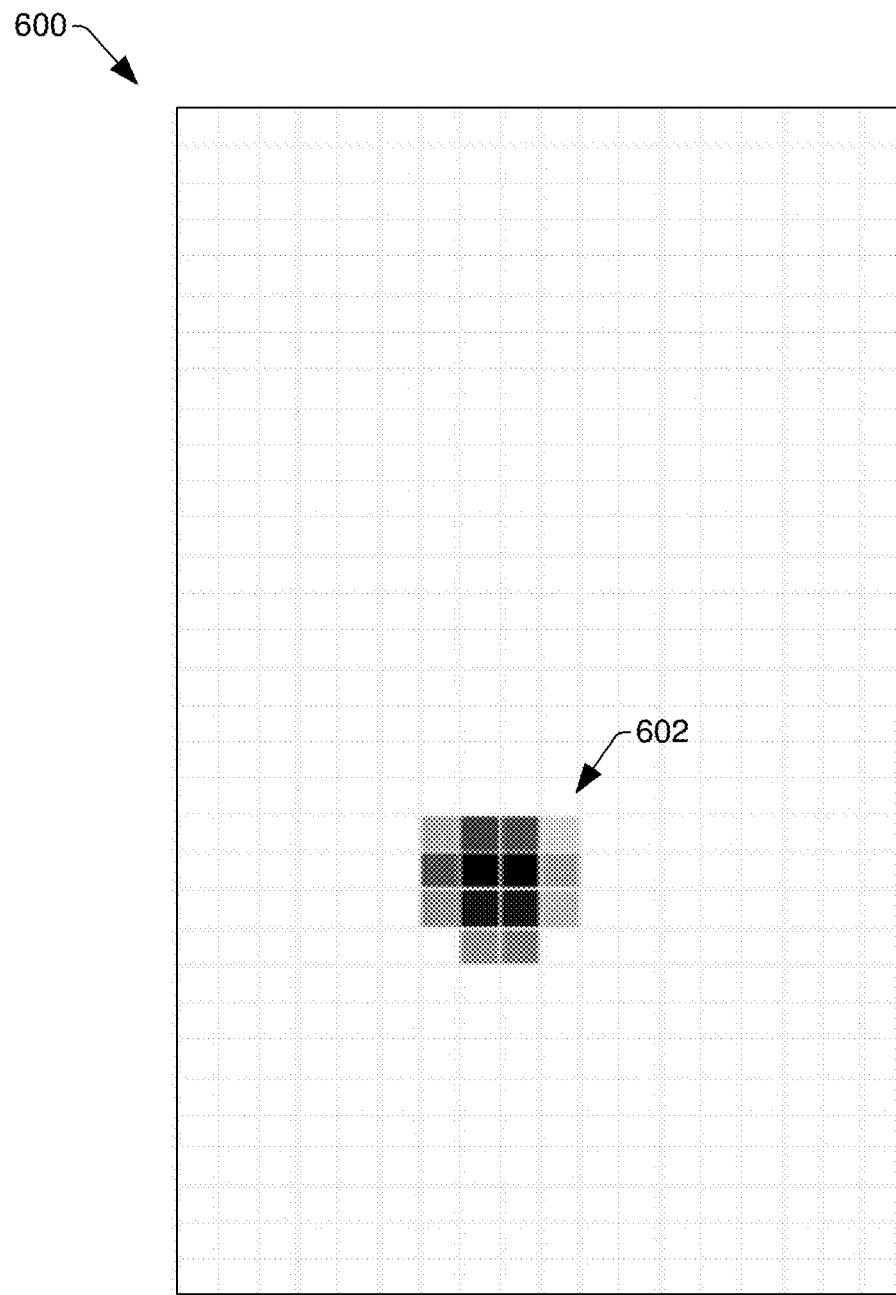
FIG. 6 illustrates a diagram of an example frame image that can be generated based at least in part on sensor data when certain surface-related sensors of the sensor array detect contact (e.g., relative intensities of contact) of a finger of the user with a certain portion (e.g., center portion) of the touch sensitive surface, in accordance with various aspects and embodiments of the disclosed subject matter.

With regard to FIGS. 5 and 6, the classification component 122 can receive the sensor data (e.g., touch surface data) from the certain surface-related sensors 112. The touch sensitive surface 104 can comprise or be associated with a sensor array 302 that can include the surface-related sensors 112, which can comprise certain surface-related sensors 112, such as, for example, capacitive sensors, that can sense capacitance levels associated with the touch sensitive surface 104. In other embodiments, the surface-related sensors 112 can comprises optical or resistive sensors that can sensor optical levels or resistance levels. The certain surface-related sensors 112 (and/or other sensors (e.g., sensors of the ultrasound component 114) can sense no contact, relative states of intensity of contact with the touch sensitive surface 104, and/or relative proximity of an object 106 (e.g., finger(s), ear, or face of the user) to the touch sensitive surface 104 without touching the touch sensitive surface. For instance, in some implementations, the sensor array 302 of surface-related sensors 112 can be capable of detecting or determining a level of intensity of contact of an object 106 with the touch sensitive surface 104, wherein the level of intensity of contact can relate to, for example an amount of pressure applied by an object 106 on the touch sensitive surface 104, an intensity of a resistance experienced at the point of contact of the object with the touch sensitive surface 104, an intensity of a capacitance experienced at the point of contact of the object 106 with the touch sensitive surface 104, and/or another type(s) of intensity relating to contact of an object 106 with one or more surface-related sensors 112 of the sensor array 302. As a result of the sensing, the certain surface-related sensors 112 (and/or other sensors) can generate sensor data, such as capacitance data (e.g., mutual capacitance data), that can correspond to the respective amounts of capacitance associated with respective portions of the touch sensitive surface 104 and can indicate respective levels of contact (e.g., no contact or respective states of intensity of contact) of an object 106 (e.g., finger(s), ear, or face of the user) with the touch sensitive surface 104 or respective proximity of the object 106, or portion thereof, to the touch sensitive surface 104.

In some embodiments, the touch sensitive device 100 also can comprise other sensors of the sensor component 110, wherein the other sensors can include, for example, an ultrasound component 114, an accelerometer component 116, a gyroscope component 118, an IMU 120, and/or another type of sensor. The classification component 122 can receive other sensor data, such as, for example, ultrasound data from the ultrasound component 114, accelerometer data from the accelerometer component 116, gyroscope data from the gyroscope component 118, IMU data from the IMU 120, and/or other types of sensor data from one or more other types of sensors.

Based at least in part on the results of analyzing the respective sensor data (e.g., mutual capacitance data) from respective surface-related sensors of the certain surface-related sensors 112 and/or the other sensor data, the classification component 122 can generate a frame image comprising one or more grayscale colored regions that can present grayscale information (e.g., corresponding to respective higher-density portions of the frame image) illustrating respective intensities of contact of an object(s) 106 (e.g., finger(s), face, ear, palm, or stylus, . . . ) of or associated with the user with the respective portions of the touch sensitive surface 104 and/or respective proximities of respective portions of the object(s) 106 to the touch sensitive surface 104.

The classification component 122 can determine or identify that the type of touch or hover interaction(s) of the object(s) 106 with the touch sensitive surface 104 and can further determine that whether the touch or hover interaction(s) is an intentional touch interaction or an unintentional touch or hover interaction, based at least in part on the results of analyzing the sensor data and/or other sensor data (e.g., raw sensor data and/or other raw sensor data) and/or analyzing the frame image generated from the sensor data and/or the other sensor data. Based at least in part on the classification of the touch interaction(s) being an intentional touch interaction or the classification of the interaction(s) being an unintentional touch or hover interaction, and/or the type of touch or hover interaction(s) on the touch sensitive surface 104, accordingly, the operations management component 124 can control the operation of the touch sensitive device 100 to perform an operation (e.g., selection of a button, control, or application, . . . ) that can correspond to the touching of the touch sensitive surface 104, in response to determining that a touch interaction is an intentional touch interaction, or to reject the touch or hover interaction(s) and not perform a particular operation and/or disable the touch sensitive surface 104 and/or turn off the touch sensitive surface 104 or associated display screen of the device 100, in response to determining that a particular touch or hover interaction is an unintentional touch or hover interaction.

With further regard to FIG. 5 (along with FIGS. 1, 2, and 3), FIG. 5 illustrates a diagram of an example frame image 500 as part of a visual representation 550 of a top view of the touch sensitive device 100, wherein the example frame image 500 can comprise or represent frame data that can be determined during a time period when sensor data for a frame is acquired by the touch sensing component 102 and associated sensor component 110 in connection with a user having the device 100 near the user's ear, in accordance with various aspects and embodiments of the disclosed subject matter. During the time period, the surface-related sensors 112 can respectively sense no contact by an object, relative states of intensity of contact of an object (e.g., finger(s), ear, face, or palm of the user hovering with respect) with the touch sensitive surface 104, and/or relative proximity of the object to the touch sensitive surface 104 without touching the touch sensitive surface, and, accordingly, can generate sensor data (e.g., capacitance data) based at least in part on the respective sensing of the respective surface-related sensors 112. The sensor data (e.g., capacitance data) can correspond to the respective touch-related levels (e.g., respective amounts of capacitance) associated with respective portions of the touch sensitive surface 104 and can indicate respective levels of contact (e.g., no contact or respective states of intensity of contact) of an object(s) with the touch sensitive surface 104 or respective proximity of the object, or portion thereof, to the touch sensitive surface 104.

The classification component 122 (e.g., classification engine(s)) can receive the sensor data from the surface-related sensors 112. In some embodiments and under certain circumstances (as more fully described herein), the classification engine also can receive other sensor data (e.g., ultrasound data, accelerometer data, gyroscope data, and/or IMU data) from other sensors (e.g., ultrasound component 114, accelerometer component 116, gyroscope component 118, IMU 120, and/or another type of sensor) of the sensor component 110. Based at least in part on the results of analyzing the respective sensor data from respective surface-related sensors of the surface-related sensors 112 and/or the other sensor data from the other sensors, the classification component 122 can generate the frame image 500 that can comprise interaction pattern 502 (e.g., a particular grayscale colored region), interaction pattern 504, and interaction pattern 506. With regard to the frame image 500 of FIG. 5, an ear interaction of an ear of the user with the touch sensitive surface 104 can yield the interaction pattern 502, a cheek interaction of the cheek of the user with the touch sensitive surface 104 can provide the relatively uniform interaction pattern 504, which can have an ovular shape and can correspond to the cheek interaction, and a hair or head interaction of the hair or head of the user can yield the interaction pattern 506, which can have some uniformity, but potentially can be influenced by the presence of elongated striations 508 due to contact of the hair of the user with the touch sensitive surface 104.

The classification component 122 can determine or identify that the touch or hover interactions comprise the ear interaction, the cheek interaction, and the hair or head interaction of the user with respective regions of the touch sensitive surface 104 and can further determine (e.g., classify) that such touch or hover interactions are unintentional touch or hover interactions, based at least in part on the results of analyzing the sensor data (e.g., touch surface data) and/or the other sensor data (e.g., ultrasound data, accelerometer data, gyroscope data, and/or IMU data), and/or the results of analyzing the frame image 500 generated from the sensor data and/or the other sensor data, and the training of the classification component 122 (e.g., classification engine of the classification component 122), in accordance with the defined classification criteria. It will be appreciated that each of interaction patterns 502, 504, and 506 can provide a signature that viewed collectively or individually can be capable of being classified (e.g., by the classification component 122) or that can be capable of being used (e.g., by the classification component 122) to corroborate a classification of the hover or touch interaction(s) with the touch sensitive surface 104.

It also is to be appreciated and understood that there can be many different variations of this. For example, a user may wear glasses that wrap around the rear of the ear and therefore are supported by the ear in ways that potentially can adjust the contact pattern sensed by the sensors (e.g., surface-related sensors 112, and/or ultrasound component 114, . . . ) of or associated with the touch sensitive surface 104 when the touch sensitive device 100 (e.g., phone) is held up against an ear of the user. Similarly, the user may wear headgear that at least potentially can be sensed (e.g., by the surface-related sensors 112, and/or ultrasound component 114, . . . ) or piercings and/or jewelry that can be sensed (e.g., by the surface-related sensors 112, and/or ultrasound component 114, . . . ) and can create particular touch (e.g., contact) or hover patterns with the touch sensitive surface 104, wherein such touch or hover interactions can be, or at least potentially can be, particularly useful in determining (e.g., by the classification component 122) when a head of a user is held against the touch sensitive surface 104 of the touch sensitive device 100.

In response to the touch or hover interaction(s) being classified by the classification component 122 as unintentional, the operations management component 124 can receive a message regarding the unintentional touch or hover interaction(s) from the classification component 122 and can take appropriate action. For example, the operations management component 124 can reject the unintentional touch or hover interaction, prevent an operation from being performed by the device 100 in response to the unintentional touch or hover interaction, disable a touch-related function associated with the touch sensitive surface 104 and associated display screen of the display component 108, transition (or maintain) the display screen from an on state to (or in) an off state, transition (or maintain) the touch sensitive surface 104 from an unlock state to (or in) a locked state, and/or transition (or maintain) a component (e.g., a processor, such as an application processor) of the device 100 from an active state to (or in) an inactive state (e.g., sleep mode).

Referring briefly to FIG. 6 (along with FIGS. 1, 2, and 3), FIG. 6 illustrates a diagram of an example frame image 600 that can be generated based at least in part on sensor data when certain surface-related sensors 112 of the sensor array 302 detect contact (e.g., relative intensities of contact) of a finger of the user with a certain portion (e.g., center portion) of the touch sensitive surface 104, in accordance with various aspects and embodiments of the disclosed subject matter. The frame image 600 can represent a frame associated with the touch sensitive surface 104 at a time during which a finger of the user is in contact with a particular portion (e.g., center portion) of the touch sensitive surface 104. The respective certain surface-related sensors 112 and/or other sensors (e.g., ultrasound component 114, accelerometer component 116, gyroscope component 118, IMU 120, and/or another type of sensor) of the sensor component 110 can respectively sense no contact by an object with the touch sensitive surface 104, relative states of intensity of contact of an object (e.g., finger(s) of the user) with the touch sensitive surface 104, and/or relative proximity of the object to the touch sensitive surface 104 without touching the touch sensitive surface 104, and, accordingly, can generate sensor data (e.g., touch surface data, such as capacitance data, ultrasound data, accelerometer data, gyroscope data, and/or IMU data) based at least in part on the respective sensing of the respective surface-related sensors 112 and/or the other sensors of the sensor component 110.

The classification component 122 can receive the sensor data from the certain surface-related sensors 112 and/or the other sensor data from the other sensors of the sensor component 110. Based at least in part on the results of analyzing the respective sensor data from respective surface-related sensors of the certain surface-related sensors 112 and/or the other sensor data from the other sensors, the classification component 122 can generate the frame image 600 comprising the grayscale colored region 602 that can present grayscale information (e.g., corresponding to respective higher-density portions of the frame image 600) depicting respective intensities of contact of respective portions of the finger of the user with the respective portions of the touch sensitive surface 104 and/or respective proximities of respective portions of the finger of the user to the touch sensitive surface 104. For example, the grayscale colored region 602 can indicate that an object, which correspond to (e.g., be in the shape of) a finger (e.g., a tip, knuckle, or other portion of the finger), is in contact with the portion (e.g., a center or approximately center portion) of the touch sensitive surface 104 that can correspond to the location of the grayscale colored region 602 depicted in the frame image 600. The classification component 122 can determine or identify that the touch event is a finger touch of the user on such portion (e.g., center portion) of the touch sensitive surface 104 and can further determine that such finger touch is an intentional touch interaction (e.g., an intentional touch event), based at least in part on the results of analyzing the sensor data and/or other sensor data (e.g., raw sensor data and/or other raw sensor data) and/or analyzing the frame image 600 generated from the sensor data and/or the other sensor data.

Based at least in part on the classification of the touch interaction being an intentional touch interaction and being a finger touch of the portion (e.g., center or approximately center portion) of the touch sensitive surface 104 that can correspond to the location of the grayscale colored region 602, the operations management component 124 can control the operation of the touch sensitive device 100 to perform an operation (e.g., selection of a button, control, or application, . . . ) that can correspond to such touching of the touch sensitive surface 104.

With further regard to FIG. 1 and classification of touch or hover interactions of objects 106 with the touch sensitive surface 104, in accordance with various embodiments, the classification component 122 can perform an initial classification of the touch or hover interaction of an object 106 with the touch sensitive surface 104, based at least in part on the results of an analysis of one or more types of sensor data (e.g., ultrasound data and/or touch surface data), in accordance with the defined classification criteria. As desired (e.g., when in accordance with the defined classification criteria), the classification component 122 also can perform additional analysis of other sensor data (e.g., ultrasound data, accelerometer data, gyroscope data, IMU data, and/or other type of sensor data) to facilitate verifying or confirming the initial classification of the touch or hover interaction (e.g., to make a final or updated classification of the touch or hover interaction).

For example, if the initial classification of the touch or hover interaction of an object 106 with the touch sensitive surface 104, based at least in part on the touch surface data, is an intentional finger touch of the touch sensitive surface 104 by the user, and if the analysis of the other sensor data indicates that there is an intentional finger touch of the touch sensitive surface 104 by the user, the classification component 122 can determine that the other sensor data analysis confirms the initial classification of the touch interaction, and can determine (e.g., make a final determination) that the classification associated with the touch interaction of the object 106 with the touch sensitive surface 104 is an intentional finger touch of the touch sensitive surface 104. If, however, the initial classification or the touch or hover interaction, based at least in part on the touch surface data, is that there is contact with the touch sensitive surface 104, and such contact is an unintentional touch of a palm and finger of the user with the touch sensitive surface 104, and if the analysis of the other sensor data indicates that a finger of the user is in contact with the touch sensitive surface 104 and such contact is an intentional touch of the finger of the user with the touch sensitive surface 104, the classification component 122 can determine that the other sensor data analysis does not confirm the initial classification determined using the touch surface data, and can determine that no classification of the touch or hover interaction can be determined based on such sensor data, and/or can determine that other types of sensor data are to be analyzed, and/or can determine that additional touch surface data and/or other sensor data are to be collected and analyzed, to facilitate determining a classification of the touch or hover interaction of the object 106 with the touch sensitive surface 104.

In other implementations, if the initial classification attempt of the touch or hover interaction of an object 106 with the touch sensitive surface 104, based at least in part on the touch surface data, was inconclusive or ambiguous, the analysis of the other sensor data (e.g., ultrasound data, accelerometer data, gyroscope data, IMU data, and/or other type of sensor data) by the classification component 122 can be used by the classification component 122 to facilitate determining a classification of the touch or hover interaction of the object 106 with the touch sensitive surface 104, in accordance with the defined classification criteria. In still other implementations, the classification component 122 can determine a classification of touch or hover interaction of an object 106 with the touch sensitive surface 104 based at least in part on the results of analyzing one or more types of sensor data (e.g., ultrasound data, and/or accelerometer data, . . . ), without having to analyze touch surface data or certain other types of sensor data, in accordance with the defined classification criteria.

In accordance with various embodiments, the device 100 also can comprise a processor component 140 (process. comp. 140) and a data store 142 that can be associated with (e.g., communicatively connected to) the other components (e.g., touch sensing component 102, touch sensitive surface 104, display component 108, sensor component 110, classification component 122, speakers 126, 128, and/or 130, microphones 132, 134, and/or 136, buffer component 138, . . . ) of the device 100. The processor component 140 can operate in conjunction with the other components of the device 100 to facilitate performing the various functions of the device 100. The processor component 140 can employ one or more processors, microprocessors, or controllers that can process data, such as information relating to ultrasound data, touch surface data, accelerometer data, gyroscope data, IMU data, impact or force data, vibro-acoustic data, orientation data, and/or other sensor data, classifications of touch or hover interactions, events or responsive actions (e.g., in response to touch or hover interactions), training information, machine learning information, resources, user data, applications, algorithms (e.g., classification algorithm(s), machine learning and/or training algorithm(s), . . . ), defined classification criteria, and/or other information, to facilitate operation of the device 100, as more fully disclosed herein, and control data flow between the device 100 and other components or devices of or associated with the device 100.

The data store 142 can store data structures (e.g., user data, metadata), code structure(s) (e.g., modules, objects, hashes, classes, procedures) or instructions, information relating to ultrasound data, touch surface data, accelerometer data, gyroscope data, IMU data, impact or force data, vibro-acoustic data, orientation data, and/or other sensor data, classifications of touch or hover interactions, events or responsive actions (e.g., in response to touch or hover interactions), training information, machine learning information, resources, user data, applications, algorithms (e.g., classification algorithm(s), machine learning and/or training algorithm(s), . . . ), defined classification criteria, and/or other information, to facilitate controlling operations associated with the device 100. In some implementations, the processor component 140 can be functionally coupled (e.g., through a memory bus) to the data store 142 in order to store and retrieve information desired to operate and/or confer functionality, at least in part, to the touch sensing component 102, touch sensitive surface 104, display component 108, sensor component 110, classification component 122, speakers 126, 128, and/or 130, microphones 132, 134, and/or 136, buffer component 138, etc., and/or substantially any other operational aspects of the device 100.

Figure 7:
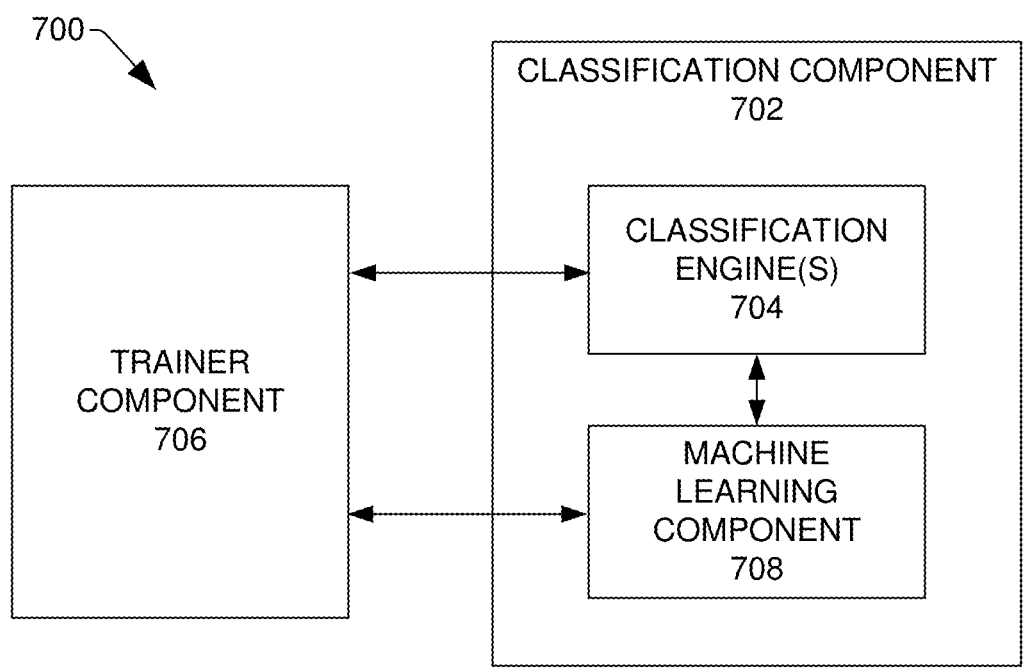
FIG. 7 depicts a block diagram of an example system that can train a classification component (e.g., one or more classification engines of the classification component) to classify touch or hover interactions of objects with the touch sensitive surface of a touch sensitive device, in accordance with various aspects and embodiments of the disclosed subject matter.

Turning to FIG. 7, FIG. 7 depicts a block diagram of an example system 700 that can train a classification component (e.g., one or more classification engines of the classification component) to classify touch or hover interactions of objects with the touch sensitive surface of a touch sensitive device, in accordance with various aspects and embodiments of the disclosed subject matter. The system 700 can comprise a classification component 702 that can include one or more classification engines, such as classification engine 704. The classification component 702, employing the classification engine(s) 704, can classify touch or hover interactions of objects with the touch sensitive surface of the touch sensitive device, based at least in part on the results of the classification component 702 analyzing sensor data received from one or more sensors of the sensor component of the touch sensitive device, such as more fully described herein.

In accordance with various embodiments, to facilitate determining classifications of touch or hover interactions of objects with the touch sensitive surface, the classification component 702 (e.g., the classification engine(s) 704 of the classification component 702) can use any number of approaches, including, but not limited to, basic heuristics, decision trees, a Support Vector Machine, Random Forest, naïve Bayes, elastic matching, dynamic time warping, template matching, k-means clustering, K-nearest neighbors algorithm, neural networks, Multilayer perceptron, logistic regression (e.g., multinomial logistic regression), Gaussian mixture models, and/or AdaBoost.

The system 700 also can comprise a trainer component 706 that can be associated with (e.g., communicatively connected to) the classification component 702 to the train the classification component 702, including the classification engine(s) 704, to identify, determine, and/or distinguish between different types of touch or hover interactions of objects with the touch sensitive surface of the touch sensitive device based at least in part on the results of analyzing touch surface data, ultrasound data, and/or the other sensor data (e.g., accelerometer data, gyroscope data, IMU data, and/or other type of sensor data) associated with the touch sensitive device. In some embodiments, the classification component 702 can comprise a machine learning component 708 that can be associated with the classification engine(s) 704, wherein the machine learning component 708 can be utilized to facilitate training the classification component 702, including the classification engine(s) 704, to identify, determine, and/or distinguish between different types of touch or hover interactions of objects with the touch sensitive surface of the device.

The trainer component 706 and the machine learning component 708 can employ desired machine learning techniques and algorithms to facilitate training the classification component 702 and associated classification engine(s) 704. In some embodiments, the trainer component 706, employing desired machine learning techniques and algorithms, can apply training information relating to touch and hover interactions of objects with a touch sensitive surface to the machine learning component 708, wherein the classification component 702, including the classification engine(s) 704, can be trained to identify, determine, and/or distinguish between different types of touch or hover interactions of objects with the touch sensitive surface based at least in part on training information.

For instance, the trainer component 706 can apply positive examples of sensor data (e.g., touch surface data, ultrasound data, accelerometer data, gyroscope data, and/or IMU data, . . . ) relating to intentional finger(s) touch interactions (e.g., single-point finger contacts, multi-point finger contacts) or finger(s) hover interactions (e.g., hovering finger(s) associated with an impending intentional touch interaction) with the touch sensitive surface of the touch sensitive device and positive examples of sensor data relating to unintentional touch or hover interactions of an object (e.g., unintentional finger(s) touch or hover interactions, unintentional ear or face touch or hover interactions, unintentional palm touch or hover interactions, . . . ) with the touch sensitive surface to the machine learning component 708 to train the classification engine(s) 704 to identify and distinguish between various different types of touch or hover interactions of objects with the touch sensitive surface.

The positive examples of the sensor data relating to touch and hover interactions can comprise, for example, positive examples of patterns of touch or hover interactions relating to intentional finger(s) touch interactions or hover interactions (associated with an intentional impending finger(s) touch interaction) with the touch sensitive surface and positive examples of patterns of touch or hover interactions relating to unintentional touch or hover interactions (e.g., unintentional finger touch or hover interactions, unintentional ear or face touch or hover interactions, or unintentional palm touch or hover interactions) with the touch sensitive surface.

As a result of the training of the classification engine(s) 704 by the trainer component 706, and the utilization of machine learning techniques and algorithms by the trainer component 706 and machine learning component 708, the classification component 702, employing the classification engine(s) 704, can desirably (e.g., accurately, suitably, or optimally) classify touch or hover interactions of objects with the touch sensitive surface, based at least in part on the results of analyzing one or more types of sensor data received from one or more sensors of the sensor component of the touch sensitive device, in accordance with the defined classification criteria.

In certain embodiments, the classification engine(s) 704 can be updated and refined (e.g., automatically or dynamically update and refined) over time to enhance classifications of touch or hover interactions of objects with the touch sensitive surface. For example, the machine learning component 708 can receive, from the trainer component 706, updates (e.g., updates of training information) relating to classifications of touch or hover interactions to apply to the classification engine(s) 704 to refine and enhance classifications of touch or hover interactions of objects with the touch sensitive surface by the classification engine(s) 704. In some embodiments, during operation of the touch sensitive device, the machine learning component 708 can train, update, refine, and/or enhance (e.g., automatically or dynamically train, update, refine, and/or enhance) the classification engine(s) 704 to refine and further improve classifications of touch or hover interactions of objects with the touch sensitive surface by the classification engine(s) 704.

It is to be appreciated and understood from this disclosed subject matter that using the techniques described herein, touch sensitive devices can be provided with improved ability to interpret patterns of contact or association (e.g., hovering) of an object with respect to a touch sensitive surface. It also is to be appreciated and understood that the ordering of and the number of method acts or operations can be changed within the spirit and scope of the disclosed subject matter.

Figure 8:
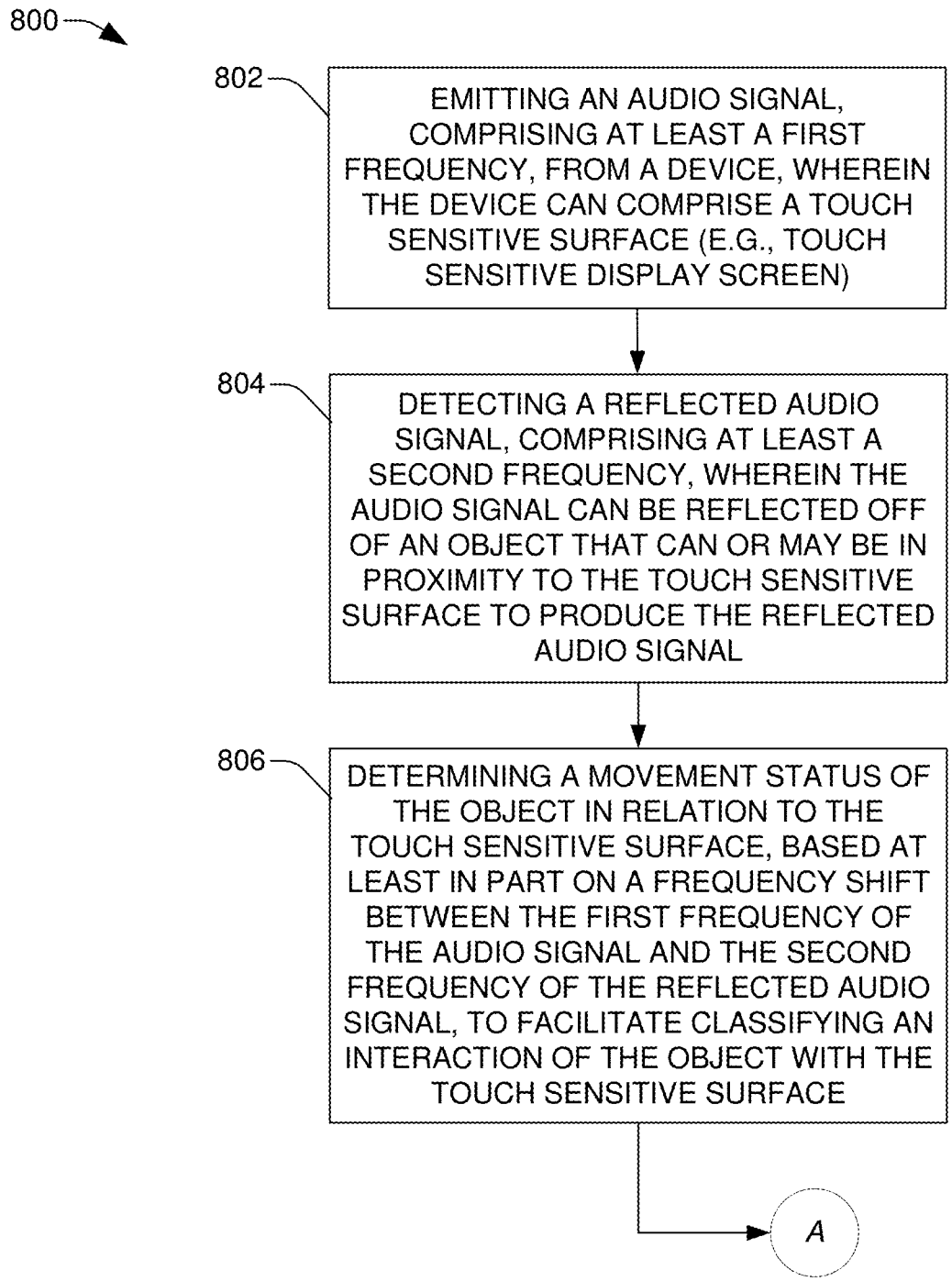
FIG. 8 illustrates a flow diagram of an example method that can determine a movement status of an object in relation to a touch sensitive surface of a touch sensitive device and/or classify a hover or touch interaction of the object with the touch sensitive surface, in accordance with various aspects and embodiments of the disclosed subject matter.

FIG. 8 illustrates a flow diagram of an example method 800 that can determine a movement status of an object in relation to a touch sensitive surface of a touch sensitive device and/or classify a hover or touch interaction of the object with the touch sensitive surface, in accordance with various aspects and embodiments of the disclosed subject matter. The method 800 can be performed, for example, by a system or device (e.g., touch sensitive device) comprising a classification component, an ultrasound component, a speaker(s), a microphone(s), and/or a processor.

At reference numeral 802, an audio signal, comprising at least a first frequency, can be emitted from a device, wherein the device can comprise a touch sensitive surface (e.g., touch sensitive display screen). The ultrasound component can generate the audio signal, which can comprise at least the first frequency. The audio signal can be an ultrasonic audio signal, for example. One or more speakers of the device can be utilized to emit the audio signal from the device (e.g., from the speaker(s) of the device).

At reference numeral 804, a reflected audio signal comprising at least a second frequency can be detected, wherein the audio signal can be reflected off of an object that can or may be in proximity to the touch sensitive surface to produce the reflected audio signal. The device can comprise one or more microphones that can sense or detect the reflected audio signal, wherein the reflected audio signal can have at least the second frequency. The reflected audio signal can be a reflected ultrasonic audio signal. Typically, the second frequency of the reflected audio signal can be higher or lower than the first frequency of the audio signal if the object is moving towards or moving away from the touch sensitive surface, respectively, and the second frequency can be the same as the first frequency if the object is not moving in relation to the touch sensitive surface. The ultrasound component can receive the detected reflected audio signal via the one or more microphones.

At reference numeral 806, a movement status of the object in relation to the touch sensitive surface can be determined, based at least in part on a frequency shift between the first frequency of the audio signal and the second frequency of the reflected audio signal, to facilitate classifying an interaction of the object with the touch sensitive surface. The classification component can determine the movement status of the object in relation to the touch sensitive surface, based at least in part on the frequency shift between the first frequency of the audio signal and the second frequency of the reflected audio signal. The classification component can utilize the determined movement status of the object in relation to the touch sensitive surface to facilitate classifying the interaction of the object with the touch sensitive surface. For instance, based at least in part on the determined movement status of the object in relation to the touch sensitive surface, and/or other analysis results determined from the ultrasound data by the classification component, and/or other sensor data (e.g., touch surface data, accelerometer data, gyroscope data, or IMU data) and analysis results obtained from analyzing such other sensor data, the classification component can classify the interaction of the object with the touch sensitive surface, such as more fully described herein.

In some embodiments, at this point, the method 800 can proceed to reference point A, wherein, with regard to the method 1000, the method 1000 can proceed from reference point A to utilize (e.g., analyze) other sensor data (e.g., touch surface data, accelerometer data, gyroscope data, or IMU data) along with the ultrasound data to determine a classification of the interaction of the object with the touch sensitive surface.

Figure 9:
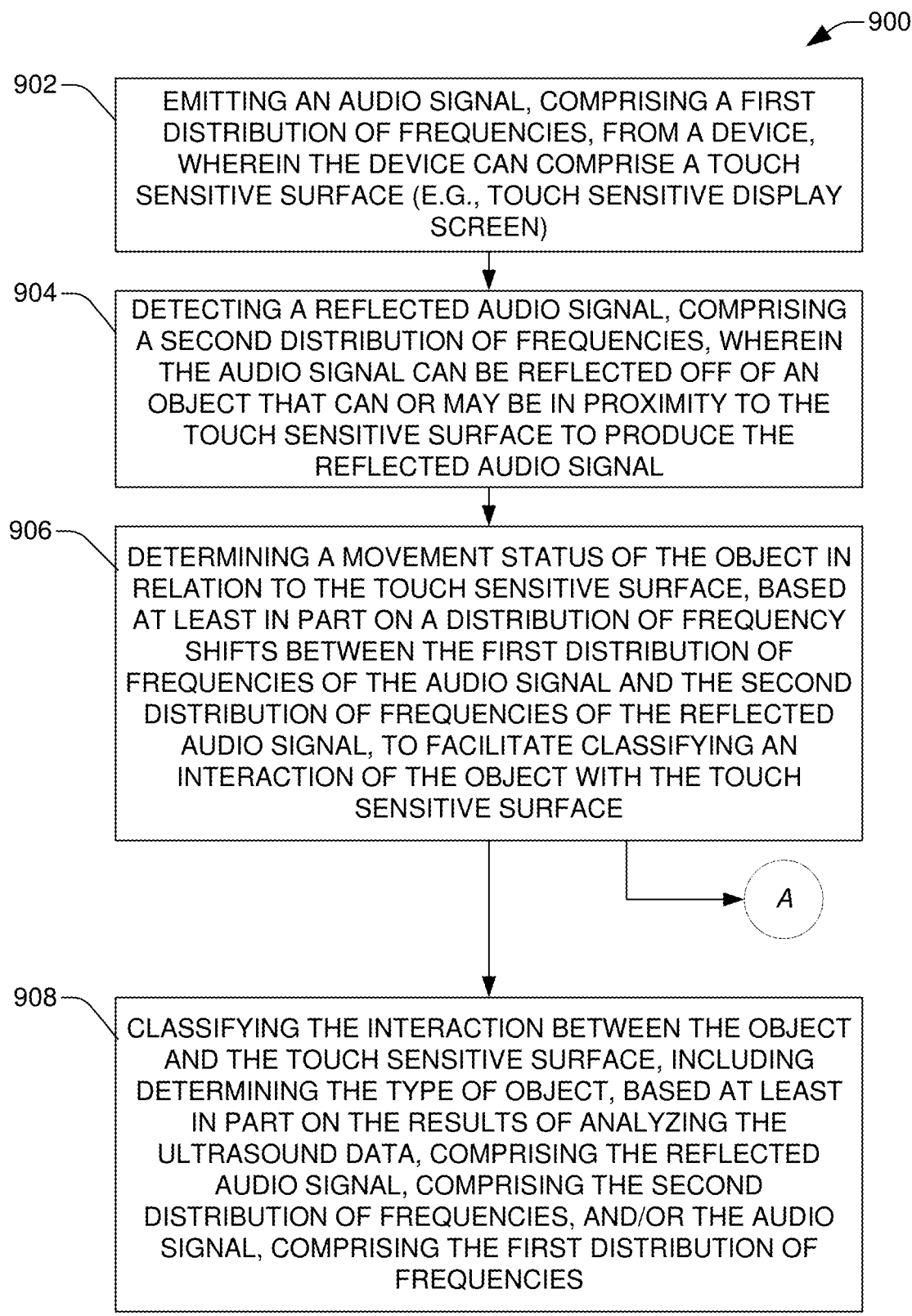
FIG. 9 depicts a flow diagram of an example method that can determine a movement status of an object in relation to a touch sensitive surface of a touch sensitive device and/or classify a hover or touch interaction of the object with the touch sensitive surface, in accordance with various aspects and embodiments of the disclosed subject matter.

FIG. 9 depicts a flow diagram of another example method 900 that can determine a movement status of an object in relation to a touch sensitive surface of a touch sensitive device and/or classify a hover or touch interaction of the object with the touch sensitive surface, in accordance with various aspects and embodiments of the disclosed subject matter. The method 900 can be performed, for example, by a system or device (e.g., touch sensitive device) comprising a classification component, an ultrasound component, a speaker(s), a microphone(s), and/or a processor.

At reference numeral 902, an audio signal, comprising a first distribution of frequencies, can be emitted from a device, wherein the device can comprise a touch sensitive surface (e.g., touch sensitive display screen). The ultrasound component can generate the audio signal, which can comprise the first distribution of frequencies (e.g., a first statistical distribution of frequencies). The audio signal can be, for example, an ultrasonic audio signal. The device can comprise one or more speakers that can be utilized to emit the audio signal.

At reference numeral 904, a reflected audio signal comprising a second distribution of frequencies can be detected, wherein the audio signal can be reflected off of an object that can or may be in proximity to the touch sensitive surface to produce the reflected audio signal. The device can comprise one or more microphones that can detect the reflected audio signal, wherein the reflected audio signal can have the second distribution of frequencies. The reflected audio signal can be, for example, a reflected ultrasonic audio signal. Typically, with regard to a particular frequency of an emitted audio signal (e.g., a particular frequency of the first distribution of frequencies of the emitted audio signal), a corresponding frequency of the reflected audio signal (e.g., a corresponding frequency of the second distribution of frequencies of the reflected audio signal) can be higher or lower than the particular frequency of the audio signal if the object is moving towards or moving away from the touch sensitive surface, respectively, and the corresponding frequency can be the same as the particular frequency if the object is not moving in relation to the touch sensitive surface. The corresponding frequency of the reflected audio signal can be the frequency that can correspond to, and be the frequency that results from, the reflection of the portion of the audio signal having the particular frequency off of the object. The ultrasound component can receive the detected reflected audio signal via the one or more microphones.

At reference numeral 906, a movement status of the object in relation to the touch sensitive surface can be determined, based at least in part on a distribution of frequency shifts between the first distribution of frequencies of the audio signal and the second distribution of frequencies of the reflected audio signal, to facilitate classifying an interaction of the object with the touch sensitive surface. The classification component can analyze the second distribution of frequencies of the reflected audio signal, the first distribution of frequencies of the audio signal, and/or the distribution of frequency shifts between the first distribution of frequencies of the audio signal and the second distribution of frequencies of the reflected audio signal. The classification component can determine the movement status of the object in relation to the touch sensitive surface, based at least in part on the results of the analysis, including a determination regarding the distribution of frequency shifts between the first distribution of frequencies of the audio signal and the second distribution of frequencies of the reflected audio signal. The classification component can utilize the determined movement status of the object in relation to the touch sensitive surface to facilitate classifying the interaction of the object with the touch sensitive surface. For instance, based at least in part on the determined movement status of the object in relation to the touch sensitive surface, and/or other analysis results determined from the ultrasound data by the classification component, and/or other sensor data (e.g., touch surface data, accelerometer data, gyroscope data, or IMU data) and analysis results obtained from analyzing such other sensor data, the classification component can classify the interaction of the object with the touch sensitive surface, such as more fully described herein.

In some embodiments, at this point, the method 900 can proceed to reference point A, wherein, with regard to the method 1000, the method 1000 can proceed from reference point A to utilize (e.g., analyze) other sensor data (e.g., touch surface data, accelerometer data, gyroscope data, or IMU data) along with the ultrasound data to determine a classification of the interaction of the object with the touch sensitive surface.

In other embodiments, additionally or alternatively, the method 900 can proceed to reference numeral 908, wherein, at reference numeral 908, the interaction between the object and the touch sensitive surface can be classified, including determining the type of object, based at least in part on the results of analyzing the ultrasound data, comprising the reflected audio signal, comprising the second distribution of frequencies, and/or the audio signal, comprising the first distribution of frequencies. The classification component can classify the interaction between the object and the touch sensitive surface, including determining the type of object (e.g., finger of user, or ear (and/or face) of the user, or a stylus, . . . ), based at least in part on the results of analyzing the ultrasound data, comprising the reflected audio signal, the audio signal, and/or the distribution of frequency shifts between the first distribution of frequencies of the audio signal and the second distribution of frequencies of the reflected audio signal.

Figure 10:
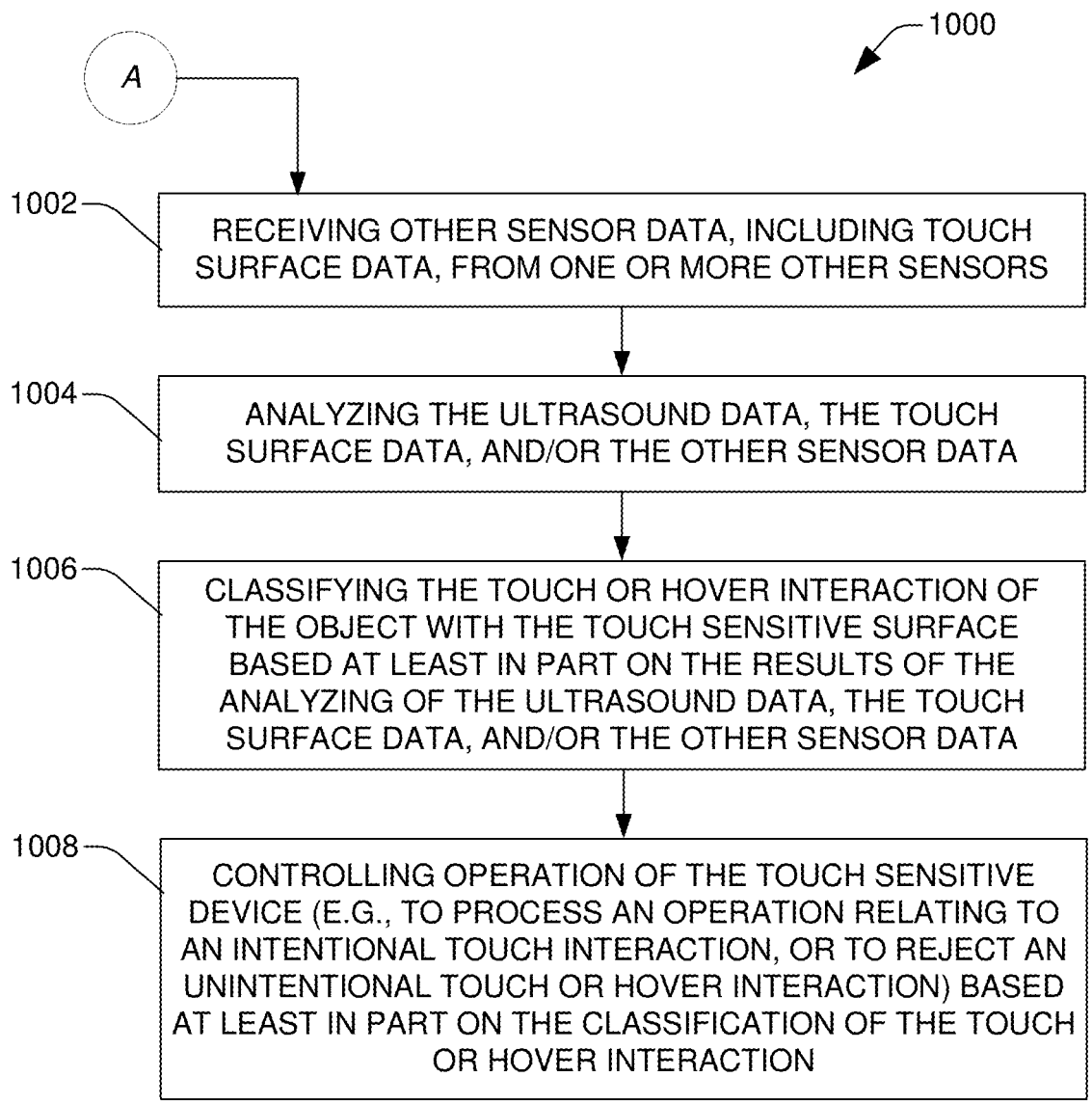
FIG. 10 illustrates a flow diagram of an example method that can classify a hover or touch interaction of an object with a touch sensitive surface of a touch sensitive device, in accordance with various aspects and embodiments of the disclosed subject matter.

FIG. 10 illustrates a flow diagram of an example method 1000 that can classify a hover or touch interaction of an object with a touch sensitive surface of a touch sensitive device, in accordance with various aspects and embodiments of the disclosed subject matter. The method 1000 can be performed, for example, by a system or device (e.g., touch sensitive device) comprising a classification component, a sensor component, a speaker(s), a microphone(s), and/or a processor. The sensor component can comprise, for example, an ultrasound component, surface-related sensors (e.g., touch sensors associated with the touch sensitive surface, such as a touch display screen), an accelerometer component, a gyroscope component, an IMU, and/or another desired type of sensor.

In accordance with various embodiments, the method 1000 can proceed from reference point A of the method 800 depicted in FIG. 8 or the method 900 depicted in FIG. 9, wherein the movement status, and/or other characteristics, of an object in relation to a touch sensitive surface of the device can be determined, based at least in part on the reflected audio signal reflected off the object in relation to the audio signal emitted from the device. For instance, at this point, the classification component already can have determined at least the movement status of the object in relation to the touch sensitive surface, based at least in part on the results of analyzing the ultrasound data (e.g., the reflected audio signal and/or the emitted audio signal).

At reference numeral 1002, touch surface data and/or other sensor data can be received from one or more other sensors. The classification component can receive one or more other types of sensor data, including touch surface data, from one or more other types of sensors (e.g., surface-related sensors, accelerometer, gyroscope, or IMU, . . . ) of the sensor component. The one or more other types of sensor data can comprise touch surface data, accelerometer data, gyroscope data, IMU data, other motion data, impact or force data, vibro-acoustic data, orientation data, and/or another type(s) of sensor data, such as described more fully herein.

In some embodiments, the classification component can receive the other sensor data from the other sensors, in response to (e.g., asynchronously in response to) a touch or hover interaction occurring and/or being detected (e.g., hover interaction being detected by the ultrasound component or classification component; touch interaction being detected by the surface-related sensors) on or in proximity to the touch sensitive surface and/or an indication of the occurrence and/or detection of a touch or hover interaction by the other sensors. In other embodiments, the sensor component can scan the other sensors to measure or detect changes in conditions associated with the other sensors due to, for example, touching of the touch sensitive surface by an object(s), wherein the other sensor data can be generated, based at least in part on the measured or detected changes in the conditions, and can be received by the classification component.

At reference numeral 1004, the ultrasound data, the touch surface data, and/or the other sensor data can be analyzed. The classification component can analyze the ultrasound data, the touch surface data, and/or the other sensor data to facilitate determining a classification of a touch or hover interaction with respect to an object (e.g., one or more object items) that can be in contact with or associated with (e.g., hovering in proximity to) the touch sensitive surface of the touch sensitive device, and can generate analysis results based at least in part on such data analysis.

At reference numeral 1006, the touch or hover interaction of the object with the touch sensitive surface can be classified based at least in part on the results of the analyzing of the ultrasound data, the touch surface data, and/or the other sensor data. The classification component can classify or determine the touch or hover interaction of the object with the touch sensitive surface based at least in part on the results of the analyzing of the ultrasound data, the touch surface data, and/or the other sensor data. For instance, the classification component can classify or determine whether the touch or hover interaction is an intentional touch interaction or an unintentional touch or hover interaction, and can classify or determine the type of object (e.g., finger(s), ear and/or face (e.g., cheek), palm, or stylus, . . . ).

In some embodiments, to facilitate classifying the touch or hover interaction of the object with the touch sensitive surface, the classification component can extract features from the ultrasound data, touch surface data, and/or other sensor data based at least in part on the analysis results. The features can comprise, for example, characteristics, shapes, dimensions, spectral centroid, spectral density, spherical harmonics, total average spectral energy, log spectral band ratios, and/or other features related to the contact or hovering of the object with the touch sensitive surface, with respect to the time domain or frequency domain, respectively.

In certain embodiments, the classification component can generate a representational image (e.g., frame image) of (e.g., corresponding to) the respective features based at least in part on (e.g., from) the respective features extracted from the ultrasound data, touch surface data, and/or other sensor data. The representational image can be or comprise a pattern relating to (e.g., representing or corresponding to) the touch or hover interaction of the object with the touch sensitive surface.

The classification component can analyze the representational image to facilitate classifying the touch or hover interaction of the object with the touch sensitive surface, in accordance with the defined classification criteria. In some embodiments, the classification component can evaluate or compare the characteristics (e.g., features) of the representational image to respective known characteristics that respectively can indicate whether a touch or hover interaction is intentional or unintentional and/or whether the touch event is a finger(s), an ear, a face, a palm, a stylus, or other object, and/or can provide one or more other indications that can facilitate classifying the touch or hover interaction. In certain embodiments, as more fully described herein, the classification component (e.g., classification engine of the classification component) can be trained to classify the touch or hover interaction of the object with the touch sensitive surface, including being trained to recognize and identify, and distinguish between, different characteristics of the representational image.

Based at least in part on the results of analyzing the representational image, the classification component can determine the classification of the touch or hover interaction of the object with the touch sensitive surface, in accordance with the defined classification criteria. The touch or hover interaction can be classified, for example, as an intentional touch interaction (e.g., an intentional finger touch, or an intentional stylus touch) or an unintentional touch or hover interaction (e.g., unintentional finger touch or hover interaction, unintentional ear or face touch or hover interaction, unintentional palm touch or hover interaction, and/or other unintentional touch or hover interaction by an object).

At reference numeral 1008, operation of the touch sensitive device can be controlled (e.g., to process an operation relating to an intentional touch interaction, or to reject an unintentional touch or hover interaction) based at least in part on the classification of the touch or hover interaction. The operation management component can control operation of the touch sensitive device based at least in part on the classification of the touch or hover interaction. For instance, in response to the classification being an intentional touch interaction, the operation management component can control operation of the touch sensitive device to process the touch interaction, including processing an operation relating to the touch (e.g., intentional finger or object touch) of the touch sensitive surface. In connection with processing the touch interaction, the operation management component can enable a touch function(s) of the touch sensitive surface, turn the display screen (e.g., touch display screen) to an on state (if it was in an off state), and/or unlock (if locked) the touch sensitive surface, for example.

In response to the classification being determined to be an unintentional touch or hover interaction, the operation management component can control operation of the touch sensitive device to reject the unintentional touch or hover interaction, including preventing an operation relating to the touch (e.g., unintentional finger, palm, or object touch) (if there was a touch) of an object with the touch sensitive surface. In connection with rejecting the touch or hover interaction, the operation management component also can disable a touch function(s) of the touch sensitive surface, turn the display screen to an off state, and/or lock the touch sensitive surface, for example.

Figure 11:
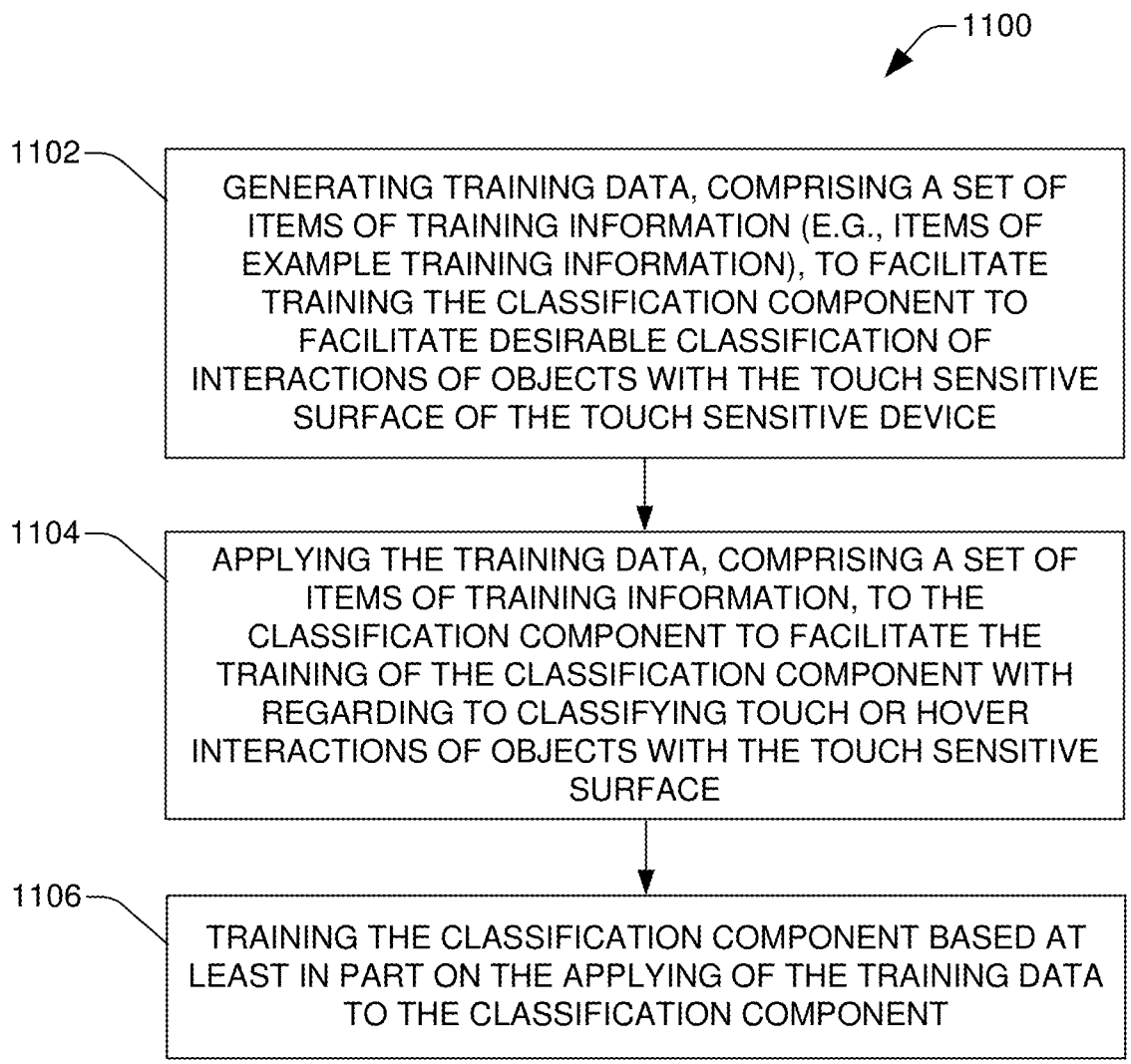
FIG. 11 depicts a flow diagram of an example method that can train a classification component to facilitate determining a movement status of an object in relation to a touch sensitive surface of a touch sensitive device and/or classifying a hover or touch interaction of the object with the touch sensitive surface, in accordance with various aspects and embodiments of the disclosed subject matter.

FIG. 11 depicts a flow diagram of an example method 1100 that can train a classification component (e.g., a classification engine(s) of the classification component) to facilitate determining a movement status of an object in relation to a touch sensitive surface of a touch sensitive device and/or classifying a hover or touch interaction of the object with the touch sensitive surface, in accordance with various aspects and embodiments of the disclosed subject matter. The method 1100 can be performed, for example, by a system or device (e.g., touch sensitive device) comprising a classification component, which can comprise one or more classification engines, a machine learning component, a trainer component, a sensor component, a speaker(s), a microphone(s), and/or a processor. The classification component, employing the machine learning component, can be trained to facilitate desirable (e.g., accurate, enhanced, or optimal) classification of interactions of objects with a touch sensitive surface of the touch sensitive device. In some embodiments, the system can employ the trainer component to train the classification component (e.g., train the one or more classification engines, using the machine learning component) to facilitate desirable classification of interactions of objects with the touch sensitive surface.

At reference numeral 1102, training data, comprising a set of items of training information (e.g., items of example training information), can be generated to facilitate training the classification component to facilitate desirable classification of interactions of objects with the touch sensitive surface of the touch sensitive device. The trainer component can determine and generate the set of items of training information, which can be employed to facilitate such training of the classification component (e.g., training of the one or more classification engines of the classification component). In some embodiments, the set of items of training information can include respective items of training information that can correspond to respective types of touch or hover interactions of objects with the touch sensitive surface.

For example, the set of items of training information can comprise positive examples of sensor data (e.g., touch surface data, ultrasound data, accelerometer data, gyroscope data, and/or IMU data, . . . ) relating to intentional finger(s) touch interactions (e.g., single-point finger contacts, multi-point finger contacts) or finger(s) hover interactions (e.g., hovering finger(s) associated with an impending intentional touch interaction) with the touch sensitive surface and positive examples of sensor data relating to unintentional touch or hover interactions of an object (e.g., unintentional finger(s) touch or hover interactions, unintentional ear or face touch or hover interactions, unintentional palm touch or hover interactions, . . . ) with the touch sensitive surface to the machine learning component to train the classification engine(s) of the classification component to identify and distinguish between various different types of touch or hover interactions of objects with the touch sensitive surface. In some embodiments, the positive examples of the sensor data relating to touch and hover interactions can comprise, for example, positive examples of patterns of touch or hover interactions relating to intentional finger(s) touch interactions or hover interactions (associated with an intentional impending finger(s) touch interaction) with the touch sensitive surface and positive examples of patterns of touch or hover interactions relating to unintentional touch or hover interactions (e.g., unintentional finger touch or hover interactions, unintentional ear or face touch or hover interactions, or unintentional palm touch or hover interactions) with the touch sensitive surface.

As another example, with regard to ultrasound data, the set of items of training information can comprise a first subset of items of training information regarding respective audio signals of respective first frequency distributions, a second subset of items of training information regarding respective reflected audio signals of respective second frequency distributions, and/or a third subset of items of training information regarding respective distributions of frequency shifts that relate to, and/or can be derived or obtained from, respective differences between the respective audio signals and the respective reflected audio signals. The trainer component can map respective items of the first subset, respective items of the second subset, and/or respective items of the third subset to each other, and can utilize such mapping to facilitate training the classification component and/or can provide such mapping to the classification component (e.g., to the machine learning component of or associated with the classification component). For example, the trainer component can map a first frequency distribution of a training audio signal (e.g., an audio signal that can be emitted from the device) to a second frequency distribution of a training reflected audio signal that can be obtained when the training audio signal is reflected off of a particular object (e.g., a finger, or an ear) with a particular movement status in relation to the touch sensitive surface (e.g., moving towards the touch sensitive surface, or moving away from the touch sensitive surface, or not moving in relation to the touch sensitive surface) and to a training distribution of frequency shifts that can be determined, derived, or obtained based at least in part on the training audio signal and the training reflected audio signal (e.g., the difference between the first frequency distribution of the training audio signal and the second frequency distribution of the training reflected audio signal).

At reference numeral 1104, the training data, comprising a set of items of training information, can be applied to the classification component to facilitate the training of the classification component with regarding to classifying touch or hover interactions of objects with the touch sensitive surface. At reference numeral 1106, the classification component can be trained based at least in part on the applying of the training data to the classification component. The trainer component can apply the training data, comprising the set of items of training information, to the classification component (e.g., to the one or more classification engines, using the machine learning component), and the classification component (e.g., the one or more classification engines) can be trained based at least in part on the applying of the training data to the classification component and the use of machine learning techniques and algorithms, such as described herein. The classification component (e.g., as trained using the method 1100), employing the machine learning component (and the machine learning techniques and algorithms, such as disclosed herein), can desirably (e.g., suitably, acceptably, accurately, or optimally) determine classifications of touch or hover interactions of objects with the touch sensitive surface of the touch sensitive device.

In some embodiments, in accordance with the method 1100, the training of the classification component can be updated and refined by applying updated and/or additional training data to the classification component to facilitate enhancing or refining the training of the classification component to desirably improve the ability of the classification component to desirably determine classifications of touch or hover interactions of objects with the touch sensitive surface.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

With regard to the methods and/or flow diagrams described herein, for simplicity of explanation, the methods have been depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed herein and throughout this specification are capable of being stored on an article of manufacture to facilitate transporting and transferring such methods to computers. The term article of manufacture, as used herein, is intended to encompass a computer program accessible from any computer-readable device or storage media.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the disclosed methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "unit," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), Blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    emitting, by a system comprising a processor, an emitted audio signal, comprising at least a first frequency, from an electronic device, wherein the electronic device comprises a touch sensitive screen;
    detecting, by the system, a reflected audio signal comprising at least a second frequency, wherein the emitted audio signal is reflected off of an object in proximity to the touch sensitive screen to produce the reflected audio signal;
    determining, by the system, a movement status of the object in relation to the touch sensitive screen, based at least in part on a frequency shift between the first frequency of the emitted audio signal and the second frequency of the reflected audio signal;
    obtaining sensor data, from surface-related sensors of the touch sensitive screen, in response to the object being in contact or in proximity with one or more portions of the touch sensitive screen; and
    classifying which type of object is interacting with the touch sensitive screen based on the movement status, the emitted audio signal, the reflected audio signal, and the sensor data.

2. The method of claim 1, wherein classifying further comprises determining a location of the object with respect to the touch sensitive screen.

3. The method of claim 1, wherein classifying which type of object comprises distinguishing whether the object is an ear of a user in contact or proximity with the touch sensitive screen, a finger of the user in contact or proximity with the touch sensitive screen, a stylus in contact or proximity with the touch sensitive screen, or no object in contact or proximity with the touch sensitive screen.

4. The method of claim 1, further comprising:
    receiving additional sensor data from an accelerometer, a gyroscope, or an inertial measurement unit of the electronic device,
and
    wherein classifying is further based on the additional sensor data.

5. The method of claim 1, further comprising:
    determining, by the system, a responsive action to be performed by the electronic device in response to classifying; and
    performing, by the system, the responsive action.

6. The method of claim 5, wherein classifying further comprises determining whether an interaction of the object with the touch sensitive screen is an intentional touch interaction or an unintentional interaction, and wherein the determining the responsive action comprises:
    in response to determining the interaction of the object with the touch sensitive screen is an intentional touch interaction, determining the responsive action, comprising at least one of processing the interaction of the object with the touch sensitive screen, transitioning the touch sensitive screen to or maintaining the touch sensitive screen in an on state, transitioning the touch sensitive screen to or maintaining the touch sensitive screen in an unlocked state, or performing, by the electronic device, an operation based at least in part on the interaction of the object with the touch sensitive screen; or
    in response to determining the interaction of the object with the touch sensitive screen is an unintentional touch interaction or an unintentional hover interaction, determining the responsive action, comprising at least one of rejecting the interaction of the object with the touch sensitive screen, transitioning the touch sensitive screen to or maintaining the touch sensitive screen in an off state, transitioning the touch sensitive screen to or maintaining the touch sensitive screen in a locked state, or preventing the operation from being performed in response to the interaction of the object with the touch sensitive screen.

7. The method of claim 6, wherein classifying further comprises determining whether the interaction is an ear touch interaction of an ear of a user in contact with the touch sensitive screen, an ear hover interaction of the ear of the user in proximity to the touch sensitive screen, a finger touch interaction of a finger of the user in contact with the touch sensitive screen, a finger hover interaction of the finger of the user in proximity to the touch sensitive screen, a stylus touch interaction of a stylus in contact with the touch sensitive screen, a stylus hover interaction of the stylus in proximity to the touch sensitive screen, or no interaction of the object with the touch sensitive screen.

8. The method of claim 1, wherein the emitting the emitted audio signal comprises emitting the emitted audio signal comprising a first distribution of frequencies, wherein the first distribution of frequencies comprises the first frequency,
    wherein the detecting the reflected audio signal comprises detecting the reflected audio signal comprising a second distribution of frequencies, wherein the second distribution of frequencies comprises the second frequency, and
    wherein the determining the movement status of the object in relation to the touch sensitive screen comprises determining the movement status of the object in relation to the touch sensitive screen based at least in part on a third distribution of the frequency shift between the first distribution of frequencies of the emitted audio signal and the second distribution of frequencies of the reflected audio signal.

9. The method of claim 1, further comprising:
    training, by the system, a machine learning component of the electronic device to classify touch interactions and hover interactions of a plurality of objects with the touch sensitive screen, based at least in part on training data relating to the touch interactions and the hover interactions of the objects with the touch sensitive screen, wherein the objects comprise the object,
    wherein the classifying further comprises classifying an interaction state of the object with respect to the touch sensitive screen based at least in part on the training of the machine learning component and sensor data relating to an interaction of the object with the touch sensitive screen, and wherein the sensor data comprises at least one of the reflected audio signal or the emitted audio signal.

10. The method of claim 9, wherein the training data comprises a set of example items of training information, and wherein the method further comprises:

applying, by the system, the set of example items of training information to the machine learning component to facilitate the training of the machine learning component, wherein the set of example items of training information indicates respective relationships between respective touch or hover interactions and at least one of respective ultrasonic sensor data of an ultrasonic sensor, respective touch sensor data of a touch sensor, respective accelerometer data of an accelerometer, respective gyroscope data of a gyroscope, or respective inertial measurement unit data of an inertial measurement unit.

11. A system, comprising:

at least one speaker configured to emit an emitted ultrasonic audio signal, comprising at least a first frequency, from an electronic device, wherein the electronic device comprises a touch sensitive screen;

at least one audio sensor configured to sense a reflected ultrasonic audio signal comprising at least a second frequency, wherein the emitted ultrasonic audio signal is reflected off of an object in proximity to the touch sensitive screen to produce the reflected ultrasonic audio signal;

a plurality of surface-related sensors for obtaining sensor data in response to the object being in contact or in proximity with one or more portions of the touch sensitive screen;

a memory that stores executable components;

a processor, operatively coupled to the memory, for executing the executable components, the executable components comprising:

a classification component configured to determine a movement status of the object in relation to the touch sensitive screen, based at least in part on a frequency shift between the first frequency of the emitted ultrasonic audio signal and the second frequency of the reflected ultrasonic audio signal, wherein the classification component is further configured to classify which type of object is interacting with the touch sensitive screen based on the movement status, the emitted audio signal, the reflected audio signal, and the sensor data.

12. The system of claim 11, wherein the classification component is configured to classify which type of object by distinguishing whether the object is an ear of a user in contact or proximity with the touch sensitive screen, a finger of the user in contact or proximity with the touch sensitive screen, a stylus in contact or proximity with the touch sensitive screen, or no object in contact or proximity with the touch sensitive screen.

13. The system of claim 11, further comprising a sensor component, wherein the classification component is configured to receive sensor information from the sensor component and classify further based on the sensor information, wherein the sensor component comprises at least one of an accelerometer component of the electronic device, a gyroscope component of the electronic device, or an inertial measurement unit of the electronic device.

14. The system of claim 11, wherein the at least one audio sensor comprises a first audio sensor and a second audio sensor of the electronic device, wherein the first audio sensor is configured to sense a first version of the reflected ultrasonic audio signal comprising a first set of characteristics in relation to the first audio sensor and the object, wherein the second audio sensor is configured to sense a second version of the reflected ultrasonic audio signal comprising a second set of characteristics in relation to the second audio sensor and the object, wherein the classification component is further configured to determine the movement status of the object in relation to the touch sensitive screen and classify, based at least in part on the first set of characteristics and the second set of characteristics, wherein the first set of characteristics comprises at least one of a first amount of time between the emission of the emitted ultrasonic audio signal and the sensing of the first version of the reflected ultrasonic audio signal, a first intensity level of the first version of the reflected ultrasonic audio signal, or a first frequency shift associated with the first version of the reflected ultrasonic audio signal, and wherein the second set of characteristics comprises at least one of a second amount of time between the emission of the emitted ultrasonic audio signal and the sensing of the second version of the reflected ultrasonic audio signal, a second intensity level of the second version of the reflected ultrasonic audio signal, or a second frequency shift associated with the second version of the reflected ultrasonic audio signal.

15. The system of claim 11, wherein the classification component is configured to determine a responsive action to be executed in response to classifying, and wherein the executable components further comprise a response component configured to execute the responsive action.

16. The system of claim 15, wherein the classification component is configured to:

classify whether an interaction of the object with the touch sensitive screen is an intentional touch interaction or an unintentional interaction;

in response to determining the interaction of the object with the touch sensitive screen is an intentional touch interaction, determine the responsive action, comprising at least one of process the interaction of the object with the touch sensitive screen, switch the touch sensitive screen to or maintain the touch sensitive screen in an on state, switch the touch sensitive screen to or maintain the touch sensitive screen in an unlocked state, or execute an operation based at least in part on the interaction of the object with the touch sensitive screen; or in response to determining the interaction of the object with the touch sensitive screen is an unintentional touch interaction or an unintentional hover interaction, determine the responsive action, comprising at least one of reject the interaction of the object with the touch sensitive screen, switch the touch sensitive screen to or maintain the touch sensitive screen in an off state, switch the touch sensitive screen to or maintain the touch sensitive screen in a locked state, or prevent the operation from being executed in response to the interaction of the object with the touch sensitive screen.

17. The system of claim 16, wherein the classification component is configured to classify by determining whether the interaction is an ear touch interaction of an ear of a user in contact with the touch sensitive screen, an ear hover interaction of the ear of the user in proximity to the touch sensitive screen, a finger touch interaction of a finger of the user in contact with the touch sensitive screen, a finger hover interaction of the finger of the user in proximity to the touch sensitive screen, a stylus touch interaction of a stylus in contact with the touch sensitive screen, a stylus hover interaction of the stylus in proximity to the touch sensitive screen, or no interaction of the object with the touch sensitive screen.

18. The system of claim 11, wherein the at least one speaker is configured to emit the emitted ultrasonic audio signal comprising a first distribution of frequencies that includes the first frequency,
wherein the at least one audio sensor is configured to sense the reflected ultrasonic audio signal comprising a second distribution of frequencies that includes the second frequency, and
wherein the classification component is further configured to determine the movement status of the object in relation to the touch sensitive screen based at least in part on a third distribution of the frequency shift between the first distribution of frequencies of the emitted ultrasonic audio signal and the second distribution of frequencies of the reflected ultrasonic audio signal.

19. The system of claim 11, wherein the executable components further comprise a training component configured to train a machine learning component of the electronic device to determine touch interactions and hover interactions of a plurality of objects with the touch sensitive screen, based at least in part on training data relating to the touch interactions and the hover interactions of the objects with the touch sensitive screen, wherein the objects comprise the object,
wherein the classifying further comprises classifying an interaction state of the object with respect to the touch sensitive screen based at least in part on the training of the machine learning component and sensor data relating to an interaction of the object with the touch sensitive screen, and
wherein the sensor information comprises the emitted audio signal and the reflected audio signal.

20. The system of claim 19, wherein the training data comprises a set of example items of training information, and wherein the training component is further configured to apply the set of example items of training information to the machine learning component to facilitate the training of the machine learning component, wherein the set of example items of training information indicates respective relationships between respective touch or hover interactions and at least one of respective ultrasonic sensor information of an ultrasonic sensor, respective touch sensor information of a touch sensor, respective accelerometer information of an accelerometer, respective gyroscope information of a gyroscope, or respective inertial measurement unit information of an inertial measurement unit.

21. A non-transitory machine-readable medium, comprising executable instructions that, when executed by a processor, facilitate performance of operations, comprising:
transmitting an emitted ultrasonic audio signal, comprising a first frequency, from an electronic device, wherein the electronic device comprises a touch sensitive surface;
sensing a reflected ultrasonic audio signal comprising a second frequency, wherein the emitted ultrasonic audio signal is reflected off of an object in proximity to the touch sensitive surface to produce the reflected ultrasonic audio signal;
determining movement activity of the object in relation to the touch sensitive surface, based at least in part on a frequency shift between the first frequency of the emitted ultrasonic audio signal and the second frequency of the reflected ultrasonic audio signal,
obtaining sensor data, from surface-related sensors of the touch sensitive screen, in response to the object being in contact or in proximity of one or more portions of the touch sensitive screen; and
classifying which type of object is interacting with the touch sensitive screen based on the movement status, the emitted audio signal, the reflected audio signal, and the sensor data.

22. The machine-readable medium of claim 21, wherein the determining the movement activity of the object in relation to the touch sensitive surface comprises:
determining the movement activity is the object is moving toward the touch sensitive surface based at least in part on the frequency shift being determined to indicate that the second frequency of the reflected ultrasonic audio signal is higher than the first frequency of the ultrasonic audio signal;
determining the movement activity is the object is moving away from the touch sensitive surface based at least in part on the frequency shift being determined to indicate that the second frequency of the reflected ultrasonic audio signal is lower than the first frequency of the ultrasonic audio signal; or
determining the movement activity is the object is not moving in relation to the touch sensitive surface based at least in part on no frequency shift being determined between the first frequency of the ultrasonic audio signal and the second frequency of the reflected ultrasonic audio signal.

* * * * *